(12) United States Patent
Morris

(10) Patent No.: US 7,512,880 B2
(45) Date of Patent: Mar. 31, 2009

(54) METHOD AND SYSTEM FOR PRESENTING PUBLISHED INFORMATION IN A BROWSER

(75) Inventor: Robert P. Morris, Raleigh, NC (US)

(73) Assignee: Swift Creek Systems, LLC, Portsmouth, NH (US)

( * ) Notice: Subject to any disclaimer, the term of this patent is extended or adjusted under 35 U.S.C. 154(b) by 406 days.

(21) Appl. No.: 11/306,346

(22) Filed: Dec. 23, 2005

(65) Prior Publication Data

US 2007/0150814 A1   Jun. 28, 2007

(51) Int. Cl.
G06F 3/00 (2006.01)
G06F 15/16 (2006.01)

(52) U.S. Cl. .................. 715/700; 715/748; 715/744; 709/206

(58) Field of Classification Search .......... 715/777, 715/744, 730
See application file for complete search history.

(56) References Cited

U.S. PATENT DOCUMENTS

| | | | |
|---|---|---|---|
| 5,491,626 A | 2/1996 | Williams et al. | |
| 5,717,923 A | 2/1998 | Dedrick | |
| 5,838,682 A | 11/1998 | Dekelbaum et al. | |
| 5,893,083 A | 4/1999 | Eshghi et al. | |
| 5,963,913 A | 10/1999 | Henneuse et al. | |
| 5,976,395 A | 11/1999 | Ha | |
| 6,029,195 A | 2/2000 | Herz | |
| 6,067,477 A | 5/2000 | Wewalaarachchi et al. | |
| 6,085,166 A | 7/2000 | Beckhardt et al. | |
| 6,148,328 A | 11/2000 | Cuomo et al. | |
| 6,240,451 B1 | 5/2001 | Campbell et al. | |
| 6,301,609 B1 | 10/2001 | Arvamudan et al. | |
| 6,353,660 B1 | 3/2002 | Burger et al. | |
| 6,363,249 B1 | 3/2002 | Nordeman et al. | |
| 6,400,381 B1 | 6/2002 | Barrett et al. | |
| 6,400,810 B1 | 6/2002 | Skladman et al. | |
| 6,430,604 B1 | 8/2002 | Ogle et al. | |
| 6,480,885 B1 | 11/2002 | Olivier | |
| 6,493,755 B1 | 12/2002 | Hansen et al. | |
| 6,549,939 B1 | 4/2003 | Ford et al. | |
| 6,587,836 B1 | 7/2003 | Ahlberg et al. | |
| 6,604,102 B2 | 8/2003 | Klein et al. | |
| 6,606,744 B1 | 8/2003 | Mikurak | |
| 6,654,790 B2 | 11/2003 | Ogle et al. | |
| 6,668,167 B2 | 12/2003 | McDowell et al. | |

(Continued)

FOREIGN PATENT DOCUMENTS

WO   WO 99/09490   2/1999

OTHER PUBLICATIONS

Microsoft Computer Dictionary, 2002, Microsoft Press, Fifith Edition.*

(Continued)

Primary Examiner—Tadesse Hailu
Assistant Examiner—Nicholas S Ulrich

(57) ABSTRACT

A computer-implemented method and system is provided for presenting published information in a browser. Aspects of the preferred embodiment include providing a user control via a browser that allows for controlling a pacing of presentation of published information in the browser; receiving a pace setting from the user control; associating the pace setting with a subscription; and queuing published information corresponding to the subscription for presentation in the browser based on the pace setting.

31 Claims, 14 Drawing Sheets

U.S. PATENT DOCUMENTS

| | | |
|---|---|---|
| 6,668,173 B2 | 12/2003 | Greene |
| 6,675,168 B2 | 1/2004 | Shapiro et al. |
| 6,697,840 B1 | 2/2004 | Godefroid et al. |
| 6,738,975 B1* | 5/2004 | Yee et al. .................... 719/310 |
| 6,751,657 B1 | 6/2004 | Zothner |
| 6,754,904 B1 | 6/2004 | Cooper et al. |
| 6,757,722 B2 | 6/2004 | Lonnfors et al. |
| 6,760,340 B1 | 7/2004 | Banavar et al. |
| 6,766,362 B1 | 7/2004 | Miyasaka et al. |
| 6,775,658 B1 | 8/2004 | Zothner |
| 6,789,228 B1* | 9/2004 | Merril et al. ................. 715/243 |
| 6,799,196 B1 | 9/2004 | Smith |
| 6,839,735 B2 | 1/2005 | Wong et al. |
| 6,839,737 B1 | 1/2005 | Friskel |
| 6,853,634 B1 | 2/2005 | Davies et al. |
| 6,907,011 B1 | 6/2005 | Miller et al. |
| 6,912,532 B2* | 6/2005 | Andersen ..................... 707/10 |
| 6,961,765 B2 | 11/2005 | Terry |
| 7,051,274 B1 | 5/2006 | Cottrille et al. |
| 7,107,285 B2 | 9/2006 | Von Kaenel et al. |
| 7,111,044 B2 | 9/2006 | Lee |
| 7,139,554 B2 | 11/2006 | Litwin |
| 7,177,859 B2 | 2/2007 | Pather et al. |
| 7,177,928 B2 | 2/2007 | Sasaki et al. |
| 7,184,524 B2 | 2/2007 | Digate et al. |
| 7,219,303 B2 | 5/2007 | Fish |
| 7,231,596 B2 | 6/2007 | Koren |
| 7,246,371 B2 | 7/2007 | Diacakis et al. |
| 7,251,482 B2 | 7/2007 | Ackermann-Markes |
| 7,263,545 B2 | 8/2007 | Digate et al. |
| 7,302,634 B2 | 11/2007 | Lucovsky et al. |
| 7,334,021 B1 | 2/2008 | Fletcher |
| 2001/0025280 A1 | 9/2001 | Mandato et al. |
| 2001/0027439 A1 | 10/2001 | Holtzman et al. |
| 2002/0007420 A1 | 1/2002 | Eydelman et al. |
| 2002/0016839 A1 | 2/2002 | Smith |
| 2002/0019816 A1 | 2/2002 | Shafrir et al. |
| 2002/0021307 A1 | 2/2002 | Glenn et al. |
| 2002/0023132 A1 | 2/2002 | Tornabene et al. |
| 2002/0026505 A1 | 2/2002 | Terry |
| 2002/0029173 A1 | 3/2002 | Goldstein |
| 2002/0055973 A1 | 5/2002 | Low et al. |
| 2002/0056004 A1 | 5/2002 | Smith |
| 2002/0087594 A1 | 7/2002 | Peters |
| 2002/0103743 A1 | 8/2002 | Najmi |
| 2002/0116461 A1 | 8/2002 | Diacakis et al. |
| 2002/0120687 A1 | 8/2002 | Diacakis et al. |
| 2002/0120774 A1 | 8/2002 | Diacakis |
| 2002/0130904 A1 | 9/2002 | Becker et al. |
| 2002/0138624 A1 | 9/2002 | Esenther |
| 2002/0169644 A1 | 11/2002 | Greene et al. |
| 2002/0183140 A1 | 12/2002 | Lamb |
| 2002/0184089 A1 | 12/2002 | Tsou et al. |
| 2003/0009530 A1 | 1/2003 | Philonenko et al. |
| 2003/0018726 A1 | 1/2003 | Low et al. |
| 2003/0018747 A1 | 1/2003 | Herland et al. |
| 2003/0043190 A1 | 3/2003 | Bernius et al. |
| 2003/0046421 A1 | 3/2003 | Horovitz et al. |
| 2003/0055898 A1 | 3/2003 | Yeager et al. |
| 2003/0055983 A1 | 3/2003 | Callegari |
| 2003/0058277 A1* | 3/2003 | Bowman-Amuah ......... 345/765 |
| 2003/0065788 A1 | 4/2003 | Salomaki |
| 2003/0084150 A1 | 5/2003 | Hansen et al. |
| 2003/0093789 A1 | 5/2003 | Zimmerman et al. |
| 2003/0097397 A1 | 5/2003 | Giannetti |
| 2003/0097410 A1 | 5/2003 | Atkins et al. |
| 2003/0119540 A1 | 6/2003 | Matthis |
| 2003/0120734 A1 | 6/2003 | Kagan et al. |
| 2003/0131073 A1 | 7/2003 | Lucovsky et al. |
| 2003/0135569 A1 | 7/2003 | Khakoo et al. |
| 2003/0144894 A1 | 7/2003 | Robertson et al. |
| 2003/0154293 A1 | 8/2003 | Zmolek |
| 2003/0182428 A1 | 9/2003 | Li et al. |
| 2003/0200268 A1 | 10/2003 | Morris |
| 2003/0211845 A1 | 11/2003 | Lohtia et al. |
| 2003/0217098 A1 | 11/2003 | Bobde et al. |
| 2003/0217099 A1 | 11/2003 | Bobde et al. |
| 2003/0217109 A1 | 11/2003 | Ordille et al. |
| 2003/0225840 A1* | 12/2003 | Glassco et al. .............. 709/206 |
| 2003/0229674 A1 | 12/2003 | Cabrera et al. |
| 2003/0233537 A1 | 12/2003 | Wohlgemuth et al. |
| 2003/0236086 A1 | 12/2003 | Litwin |
| 2003/0236830 A1* | 12/2003 | Ortiz et al. .................. 709/204 |
| 2003/0236831 A1* | 12/2003 | Ortiz et al. .................. 709/204 |
| 2003/0236832 A1* | 12/2003 | McIntyre et al. ............ 709/204 |
| 2004/0002932 A1 | 1/2004 | Horovitz et al. |
| 2004/0002967 A1 | 1/2004 | Rosenblum et al. |
| 2004/0002988 A1 | 1/2004 | Seshadri et al. |
| 2004/0003042 A1 | 1/2004 | Horvitz et al. |
| 2004/0003084 A1 | 1/2004 | Malik et al. |
| 2004/0003090 A1 | 1/2004 | Deeds |
| 2004/0003104 A1 | 1/2004 | Boskovic et al. |
| 2004/0014013 A1 | 1/2004 | Diesel et al. |
| 2004/0015553 A1 | 1/2004 | Griffin et al. |
| 2004/0015569 A1 | 1/2004 | Lonnfors et al. |
| 2004/0034848 A1 | 2/2004 | Moore et al. |
| 2004/0037271 A1 | 2/2004 | Liscano et al. |
| 2004/0054887 A1 | 3/2004 | Paulsen, Jr. et al. |
| 2004/0059781 A1 | 3/2004 | Yoakum et al. |
| 2004/0059791 A1 | 3/2004 | Sherman et al. |
| 2004/0064821 A1 | 4/2004 | Rouselle |
| 2004/0092250 A1 | 5/2004 | Valloppillil |
| 2004/0098491 A1 | 5/2004 | Costa-Requena et al. |
| 2004/0109197 A1 | 6/2004 | Gardaz et al. |
| 2004/0116119 A1 | 6/2004 | Lewis et al. |
| 2004/0117458 A1 | 6/2004 | Tominaga |
| 2004/0122896 A1 | 6/2004 | Gourraud |
| 2004/0125941 A1 | 7/2004 | Yoakum |
| 2004/0129901 A1 | 7/2004 | Yamaguchi et al. |
| 2004/0133640 A1 | 7/2004 | Yeager et al. |
| 2004/0133641 A1 | 7/2004 | McKinnon et al. |
| 2004/0145603 A1* | 7/2004 | Soares ........................ 345/730 |
| 2004/0153506 A1 | 8/2004 | Ito et al. |
| 2004/0158608 A1 | 8/2004 | Friedman et al. |
| 2004/0162881 A1 | 8/2004 | Digate et al. |
| 2004/0172455 A1 | 9/2004 | Green et al. |
| 2004/0177116 A1 | 9/2004 | McConn et al. |
| 2004/0177134 A1 | 9/2004 | Lonnfors et al. |
| 2004/0179039 A1 | 9/2004 | Blattner et al. |
| 2004/0179232 A1 | 9/2004 | Inukai et al. |
| 2004/0183829 A1 | 9/2004 | Koutny et al. |
| 2004/0187133 A1 | 9/2004 | Weisshaar et al. |
| 2004/0193488 A1 | 9/2004 | Khoo et al. |
| 2004/0201668 A1 | 10/2004 | Matsubara et al. |
| 2004/0205124 A1 | 10/2004 | Limprecht et al. |
| 2004/0205134 A1 | 10/2004 | Digate et al. |
| 2004/0205142 A1 | 10/2004 | Bahr |
| 2004/0210829 A1 | 10/2004 | Cristofari et al. |
| 2004/0215723 A1 | 10/2004 | Chadha |
| 2004/0215732 A1 | 10/2004 | McKee et al. |
| 2004/0216036 A1 | 10/2004 | Chu et al. |
| 2004/0225717 A1 | 11/2004 | Cuervo |
| 2004/0230661 A1 | 11/2004 | Rashid et al. |
| 2004/0243941 A1 | 12/2004 | Fish |
| 2004/0250283 A1 | 12/2004 | Duigenan et al. |
| 2004/0254985 A1 | 12/2004 | Horstemeyer |
| 2004/0267887 A1 | 12/2004 | Berger et al. |
| 2005/0004984 A1 | 1/2005 | Simpson |
| 2005/0004985 A1 | 1/2005 | Stochosky |
| 2005/0004995 A1 | 1/2005 | Stochosky |
| 2005/0010637 A1 | 1/2005 | Dempski et al. |
| 2005/0021624 A1 | 1/2005 | Herf et al. |
| 2005/0021626 A1 | 1/2005 | Prajapat et al. |
| 2005/0021645 A1 | 1/2005 | Kulkarni et al. |

| | | | |
|---|---|---|---|
| 2005/0027805 A1 | 2/2005 | Aoki | |
| 2005/0030939 A1 | 2/2005 | Roy et al. | |
| 2005/0039134 A1 | 2/2005 | Wiggeshoff et al. | |
| 2005/0044143 A1 | 2/2005 | Zimmermann et al. | |
| 2005/0044144 A1 | 2/2005 | Malik et al. | |
| 2005/0044242 A1 | 2/2005 | Stevens et al. | |
| 2005/0048961 A1 | 3/2005 | Ribaudo et al. | |
| 2005/0055405 A1 | 3/2005 | Kaminsky et al. | |
| 2005/0055412 A1 | 3/2005 | Kaminsky et al. | |
| 2005/0071426 A1 | 3/2005 | Shah | |
| 2005/0071428 A1 | 3/2005 | Khakoo et al. | |
| 2005/0071433 A1 | 3/2005 | Shah | |
| 2005/0071776 A1 | 3/2005 | Mansfield et al. | |
| 2005/0080848 A1 | 4/2005 | Shah | |
| 2005/0086300 A1 | 4/2005 | Yeager et al. | |
| 2005/0086309 A1 | 4/2005 | Galli et al. | |
| 2005/0096928 A1 | 5/2005 | Ruggaber et al. | |
| 2005/0097470 A1* | 5/2005 | Dias et al. | 715/723 |
| 2005/0102362 A1 | 5/2005 | Price et al. | |
| 2005/0102366 A1 | 5/2005 | Kirsch | |
| 2005/0108387 A1 | 5/2005 | Li et al. | |
| 2005/0119012 A1 | 6/2005 | Merheb et al. | |
| 2005/0119913 A1 | 6/2005 | Hornreich et al. | |
| 2005/0125496 A1 | 6/2005 | Thuerk | |
| 2005/0131778 A1 | 6/2005 | Bennett et al. | |
| 2005/0132004 A1 | 6/2005 | Horovitz et al. | |
| 2005/0132005 A1 | 6/2005 | Horovitz et al. | |
| 2005/0132006 A1 | 6/2005 | Horovitz et al. | |
| 2005/0132016 A1 | 6/2005 | Boone | |
| 2005/0135240 A1 | 6/2005 | Ozugur | |
| 2005/0165658 A1 | 7/2005 | Hayes et al. | |
| 2005/0188039 A1 | 8/2005 | Charters et al. | |
| 2005/0190744 A1 | 9/2005 | Sun et al. | |
| 2005/0197995 A1 | 9/2005 | Badt, Jr. et al. | |
| 2005/0213609 A1 | 9/2005 | Brusilovsky et al. | |
| 2005/0273499 A1* | 12/2005 | Goodman et al. | 709/206 |
| 2005/0278637 A1* | 12/2005 | Youm et al. | 715/730 |
| 2005/0280860 A1 | 12/2005 | Ito et al. | |
| 2006/0004911 A1 | 1/2006 | Becker et al. | |
| 2006/0004921 A1 | 1/2006 | Suess et al. | |
| 2006/0014546 A1 | 1/2006 | Bodin et al. | |
| 2006/0030264 A1 | 2/2006 | Morris | |
| 2006/0036712 A1 | 2/2006 | Morris | |
| 2006/0087992 A1* | 4/2006 | Ganesh | 370/310 |
| 2006/0088014 A1* | 4/2006 | Ganesh | 370/338 |
| 2006/0190117 A1 | 8/2006 | Weczorek et al. | |
| 2006/0224688 A1 | 10/2006 | Morris | |
| 2006/0248185 A1 | 11/2006 | Morris | |
| 2006/0280166 A1 | 12/2006 | Morris | |
| 2007/0005725 A1 | 1/2007 | Morris | |
| 2007/0112856 A1 | 5/2007 | Schram et al. | |
| 2007/0150441 A1 | 6/2007 | Morris | |
| 2007/0162360 A1 | 7/2007 | Congram et al. | |
| 2007/0168420 A1 | 7/2007 | Morris | |
| 2007/0288580 A1 | 12/2007 | Kaminsky et al. | |
| 2008/0046510 A1 | 2/2008 | Beauchamp et al. | |
| 2008/0046556 A1 | 2/2008 | Nicholls et al. | |
| 2008/0049734 A1 | 2/2008 | Zhakov et al. | |

OTHER PUBLICATIONS

PubSub Sidebar Adds Real-Time Monitoring of Weblogs and Newsgroups to Popular Firefox Web Browser, PR Newswire, Oct. 26, 2004.*

Bhatia, S., et al., "PHP: Hypertext: Preprocessor for SIP," [online] Jul. 2001 [retrieved on Jul. 27, 2005]; Retrieved from the Internet: <URL:http://www.ietf.org/draft-bhatia-sipping-sip-php-00.txt22 , 5 pages.

Østhus, E. C., et al., "Presence And Call Screening In VoIP," [online] Norwegian University of Science and Technology, Nov. 2004 [retrived on Jul. 28, 2005]; Retrieved from the Internet: <URL:http://www.item.ntnu.no/~lillk/stud-proj/osthus-Prosjekt_h04.pdf>, 101 pages.

Lennox, J., RFC 3050, "Common Gateway Interface For SIP," [online] The Internet Society, Jan. 2001 [retrieved on Jul. 28, 2005]; Retrieved from the Internet: <URL:http://www.ietf.org/rfc/rfc3050.txt> 35 pages.

Rosenberg, J., "A Data Model For Presence," [online] Feb. 2005 [retrieved on May 6, 2005]; Retrieved from the Internet.

Day, M., "'HTTP Envy' and Presence of Information Protocols," [online] Sep. 1998 [retrieved on May 10, 2005]; Retrieved from the Internet.

Smith, D., et al., "JEP-0124: HTTP Binding," [online] Mar. 2005 [retrieved on May 10, 2005]; Retrieved from the Internet.

Fielding, R., et al., RFC 2616, "Hypertext Transfer Protocol—HTTP/1.1," [online] The Internet Society, Jun. 1999 [retrieved on May 6, 2005].

Nielsen, H., et al., RFC 2774, "An HTTP Extension Framework" [online] The Internet Society, Feb. 2000 [retrieved on May 6, 2005].

Day, M., et al., RFC 2778, "A Model for Presence and Instant Messaging" [online] The Internet Society, Feb. 2000 [retrieved on May 6, 2005].

Day, M., et al., RFC 2779, "Instant Messaging / Presence Protocol Requirements" [online] The Internet Society, Feb. 2000 [retrieved on May 6, 2005].

Peterson, J., RFC 3859, "Common Profile for Presence (CPP)" [online] The Internet Society, Aug. 2004 [retrieved on May 6, 2005].

Peterson, J., RFC 3860, "Common Profile for Instant Messaging (CPIM)" [online] The Internet Society, Aug. 2004 [retrieved on May 7, 2005].

Sugano, H., et al., RFC 3863, "Presence Information Data Format" [online] The Internet Society, Aug. 2004 [retrieved on May 6, 2005].

P. Saint-Andre, E., RFC 3920, "Extensible Messaging and Presence Protocol (XMPP):Core" [online] The Internet Society, Oct. 2004 [retrieved on Jun. 6, 2005].

P. Saint-Andre, E., RFC 3921, "Extensible Messaging and Presence Protocol (XMPP):Instant Messaging and Presence" [online] The Internet Society, Oct. 2004.

Osborne, R., et al., "RVP: A Presence and Instant Messaging Protocol" [online] Microsoft, Aug. 2000 [retrieved on May 10, 2005].

Ramsdell, J.D., "Simple Instant Messaging and Presence Protocol Version 2.5" [online] The Mitre Corporation, Sep. 28, 2004 [retrieved on May 10, 2005].

Neilsen, H. F. (Microsoft) and Ruellan, H. (Canon), Ed., "Soap 1.2 Attachment Feature," [online] W3C, MIT, ERCIM, Keio, Jun. 8, 2004 [retrieved on Aug. 4, 2005].

Mitra, N. (Ericsson), Ed., "Soap Version 1.2 Part 0: Primer," [online] W3C, MIT, ERCIM, Keio, Jun. 24, 2003 [retrieved on Aug. 4, 2005].

Saint-Andre, P., "JEP-0119: Extended Presence Protocol Suite," [online] Jabber Software Foundation Mar. 28, 2005 [retrieved on Aug. 4, 2005].

Sugano, H., et al., "Presence Information Data Format (PIDF)," [online] The Internet Society, May 2003 [retrieved on Aug. 4, 2005].

Rosenberg, J., et al., RFC 3261, "SIP: Session Initiation Protocol," [online] The Internet Society, Jun. 2002 [retrieved on Aug. 4, 2005].

KnowNow LiveBrowser [online] KnowNow, Inc., Aug. 13, 2004 [retrieved on Jun. 17, 2005].

European Telecommunications Standards Institute (ETSI) / 3rd Generation Partnership Project, Jan. 2005, 26 pages.

Association of Radio Industries and Business (ARIB) / 3rd Generation Partnership Project, Sep. 2004, 13 pages.

Boman, K., "Presence Security Architecture" (3GPP SA3 Meeting #25, SA3-020569), Ericsson / 3rd Generation Partnership Project, Nov. 2002, 11 pages.

Liscano, R., Presence and Awareness Services: (FIW 2003 Jun. 11, 2003), University of Ottawa, School of Information Technology and Engineering, Jun. 11, 2003, 89 pages.

Eatmon, R., et al., "JEP-0004: Data Forms," [online] Jan. 5, 2006 [retrieved on Feb. 16, 2006]; Retrieved from the Internet.

Millard, P., et al., "JEP-0060: Publish-Subscribe," [online] Mar. 3, 2005 [retrieved on Feb. 16, 2006]; Retrieved from the Internet.

Lonnfors, M., et al., "Partial Publication of Presence Information," [online] Feb. 6, 2004 [retrieved Jan. 6, 2006]; Retrieved from the Internet.

Mohr, G., "WhoDP: Widely Hosted Object Data Protocol," [online] Mar. 2, 1998 [retrieved Jan. 6, 2006]; Retrieved from the Internet.

"An Exploration Of Dynamic Documents," [online] 1999 [retrieved on Mar. 3, 2006]; Retrieved from the Internet.

Capra, et al., "Exploiting Reflection in Mobile Computing Middleware," in : ACM Sigmobile, Mobile Computing and Communications Review, vol. 6, Issue 4, pp. 34-44, Oct. 2002 [retrieved on Oct. 6, 2007] Retrieved from the Internet: <URL: http://www.lancs.ac.uk/postgrad/gracep/capra.pdf>.

* cited by examiner

F3 NOTIFY  example.com server-> watcher

NOTIFY sip:user@watcherhost.example.com SIP/2.0
    Via: SIP/2.0/TCP server.example.com;branch=z9hG4bKna998sk
    From: <sip:resource@example.com>;tag=ffd2
    To: <sip:user@example.com>;tag=xfg9
    Call-ID: 2010@watcherhost.example.com
    Event: presence
    Subscription-State: active;expires=599
    Max-Forwards: 70
    CSeq: 8775 NOTIFY
    Contact: sip:server.example.com
    Content-Type: application/cpim-pidf+xml
    Content-Length: ..

[PIDF Document]

F4 200 OK watcher-> example.com server

SIP/2.0 200 OK
    Via: SIP/2.0/TCP server.example.com;branch=z9hG4bKna998sk
      ;received=192.0.2.2
    From: <sip:resource@example.com>;tag=ffd2
    To: <sip:user@example.com>;tag=xfg9
    Call-ID: 2010@watcherhost.example.com
    Pace: HOLD
    CSeq: 8775 NOTIFY
    Content-Length: 0

Simple Pacing preferences

FIG. 11

```
>>Request
NOTIFY /instmsg/aliases/maxb HTTP/1.1
Host: im.fabrikamwidgets.com
RVP-Notifications-Version: 0.2
RVP-Ack-Type: DeepOr
RVP-Hop-Count: 1
RVP-From-Principal: http://im.example.com/instmsg/aliases/deriks
Content-Type: text/xml
Content-length: XXXX
<?xml version="1.0"?>
<Z:notification xmlns:D="DAV:"
xmlns:Z="http://schemas.microsoft.com/rvp/">
<Z:message>
.
.
.
</Z:message>
</Z:notification>

>>Response
HTTP/1.1 200 Successful
RVP-Notifications-Version: 0.2
PACE: 5s
```

RVP Pacing preferences

FIG. 12

```
<iq type="set" from="sub1@foo.com/home" to="pubsub.jabber.org"
    id="sub1">
    <pubsub xmlns="http://jabber.org/protocol/pubsub">
        <subscribe node="generic/slideshow" jid="sub1@foo.com"
            pace="ack" window="2"/>
    </pubsub>
</iq>

<iq type="result" from="pubsub.jabber.org" to="sub1@foo.com/home"
    JEP-0060: Publish-Subscribe 15 of 60 6/17/2005 11:11 AM id="sub1">
    <pubsub xmlns="http://jabber.org/protocol/pubsub">
        <entity node="generic/slideshow" jid="sub1@foo.com"
            affiliation="none" subid="123-abc"
            subscription="subscribed" pace="ack"/>
    </pubsub>
</iq>
```

Jabber PubSub Subsription

FIG. 13

<presence to=juliet@example.com type="subscribe" pace="go" />

XMPP_IM Presence Protocol

FIG. 14

METHOD AND SYSTEM FOR PRESENTING PUBLISHED INFORMATION IN A BROWSER

CROSS-REFERENCE TO RELATED APPLICATION

The present invention is related to co-pending U.S. patent application Ser. No. 11/160,612 entitled "METHOD AND APPARATUS FOR BROWSING NETWORK RESOURCES USING AN ASYNCHRONOUS COMMUNICATIONS PROTOCOL," filed on Jun. 30, 2005, and assigned to the assignee of the present application and herein incorporated by reference.

BACKGROUND

Today's more popular browsers, such as MICROSOFT'S INTERNET EXPLORER and MOZILLA FOUNDATION'S FIREFOX, use synchronous communications protocols, such as the Hypertext Transport Protocol (HTTP), to exchange information over the Internet. With a synchronous communications protocol, one entity in a network (e.g., the browser) makes a connection to another network entity (e.g., a web server), sends a request to the other entity, then waits for a reply before sending additional requests.

Synchronous communications protocols work well for supporting certain browsing tasks, such as when the browser sends a request to the web server for a web page, and then waits for a reply from the server to display the requested page. Other browsing tasks, however, are not carried out as efficiently using synchronous communications protocols. For example, an application, such as a web service, may need to notify the browser that an event has occurred. A method and protocol enabling this is disclosed in the cross-referenced U.S. patent application Ser. No. 11/160,612. In the supported protocols the web service does not need to wait for a response from the browser. However, allowing the Web service to send notifications without some form of pacing by either the browser or the Web service could result in published information associated with the notifications being presented at the browser too quickly for user to view or process.

Current methodologies for controlling flow in network protocols fail to provide a solution. For example, conventional network-level flow control occurs below the application layer of a network protocol. In this type of flow control, updates transmitted by a server are received on a client device and may be buffered in a network stack before being displayed in the application. If a user's application allows the display of the updates to be paused, the network stack may eventually run out of buffer space. This will trigger a flow control message in the client device that is sent to the server to request that the server stop sending updates. This type of flow control is based on system resource constraints, rather than by the control of the user or the application to pace the rate at which the updates are sent.

Current client-side caching also does not allow a user or application to pace the rate at which updates are sent and displayed. For example, conventional browsers and media players may make use of a cache for storing content received over a network from a server. However, this does not provide any type of flow control under direct control of the user, rather content is merely buffered in the cache on the client device. If the client runs out of cache space, older cached content is typically discarded to make room for new content. Further there is no ordering to the content in current browser caches. As in traditional flow control, this method is driven by system resource constraints and not controlled directly by user or application requirements.

A user can pace the rate of data received on a client device by using a request/response protocol, which is utilized in conventional browsers. Although, there is a one to one relationship between a request and a response containing the data, this type of protocol is unsuitable for receiving real-time data or data that is event generated. It is inefficient in that it requires the initiation of a separate request for each update/resource. The request/response protocol almost always requires the user to explicitly instruct the device to send the next request and thus is not useful where a passive mode of data reception is most appropriate.

SUMMARY

A computer-implemented method and system are provided for presenting published information in a browser. Aspects of the preferred embodiment include providing a user control via a browser that allows for controlling a pacing of presentation of published information in the browser; receiving a pace setting from the user control; associating the pace setting with a subscription; and queuing published information corresponding to the subscription for presentation in the browser based on the pace setting.

In another embodiment, a method and system are provided for allowing a user to control the pace at which published information associated with a subscription is presented in a browser. Aspects of the embodiment include receiving a pacing setting via a browser; associating the pacing setting with a current subscription; receiving published information associated with the current subscription; and delaying the presentation of the published information based on the pacing setting.

According to the method and system disclosed herein, published information is presented in a browser such that the rate of presentation of the published information associated with a subscription is user-controllable. As a result a user can be provided direct rate control through a variety of GUI mechanisms, such that bursty updates to the published information can be paced via the browser so the user is able to process the information. A further advantage is that the pace of presenting the published information can be browser specific, rather than controlled by network layer code. A further advantage is that the published information caching of the present embodiment may be used together with network layer flow control and application level pacing of notifications.

BRIEF DESCRIPTION OF SEVERAL VIEWS OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and:

FIGS. 10-14 are diagrams illustrating configuration of the subscription pace settings.

DETAILED DESCRIPTION

Figure 1:
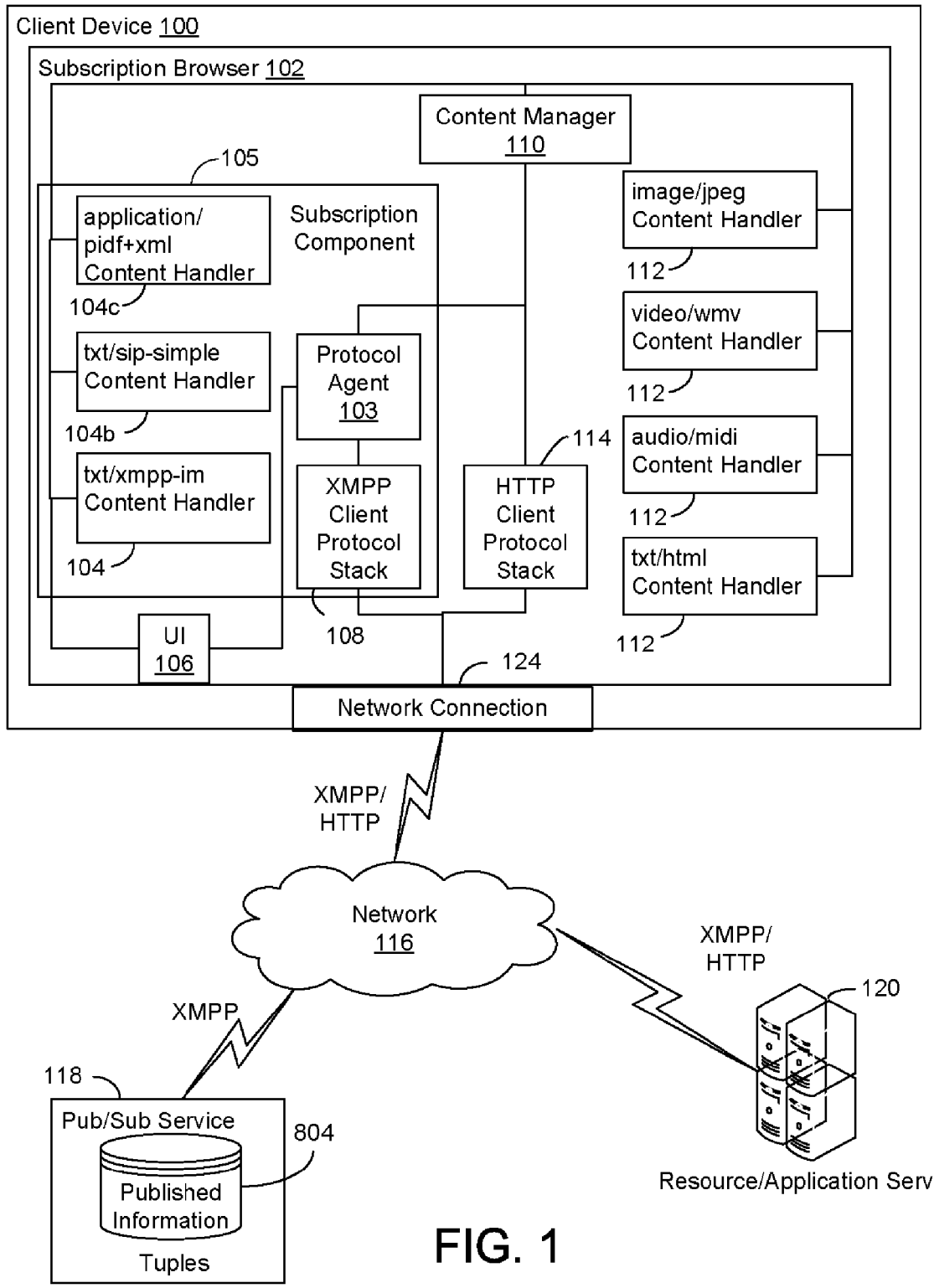
FIG. 1 is a block diagram illustrating a system for controlling the pacing of published information in accordance with an exemplary embodiment.

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

The preferred embodiment provides a method and system for subscribing to published information and for controlling a pacing of presentation of the published information in a browser. The exemplary embodiment makes use of a publish/subscribe (pub/sub) communication architecture to allow consumers to subscribe to published information and view the information through the browser. A pub/sub communication architecture and its underlying messaging protocol allow published information to be sent to a subscriber as it is received, in many instances, substantially in real-time in relation to the publication of the information. Information is published within the pub/sub communication architecture using a publish command. The published information can then be communicated to a subscriber using a notify command. The notify command can either include the published information or can provide a reference to the published information. Accordingly, there exists a one-to-one correspondence between publish and notify commands in current pub/sub communication architectures.

As used here, "published information" not only encompasses the one-to-one correspondence between publish and notify commands, but should also be understood to include both information published via multiple publish commands (or events) that are included in or referenced by a notify command and information published via a publish command that is included in or referenced by multiple notify commands. Occasionally, the phrase "instance of published information" (plural or singular) is used to describe a distinct unit of published information for the purposes of transmitting, queuing, presenting, etc., the published information. Persons of ordinary skill in the art will understand that such instances of published information can correspond to the information published via one or more publish commands and/or can be included in or referenced by one or more notify commands.

Published information may include presence information and/or other content associated with a network resource. According to the exemplary embodiment, the browser provides user controls that allow for the setting of a pace setting that controls the rate at which published information is presented without requiring separate requests/fetches of the content associated with the subscription.

FIG. 1 is a block diagram illustrating a system for controlling the pacing of published information in accordance with an exemplary embodiment. The system 10 includes a client device 100 in communication with a pub/sub service 118. The client device 100 may be any electronic device that includes a network connection 124 for communicating over a network 116. Example types of such computing devices include a camera phone, a personal digital assistant (PDA), a personal computer (PC), network-enabled camera, and the like.

As disclosed in co-pending U.S. patent application Ser. No. 11/160,612 entitled "METHOD AND APPARATUS FOR BROWSING NETWORK RESOURCES USING AN ASYNCHRONOUS COMMUNICATIONS PROTOCOL, the client device 100 includes a subscription browser 102. The subscription browser 102 includes an architecture similar to standard Web browsers, such as MICROSOFT'S INTERNET EXPLORER or MOZILLA FOUNDATION'S FIREFOX, but the client device 100 is further provided with a subscription component 105 that enables the subscription browser 102 to communicate via a pub/sub protocol with the pub/sub service 118.

The subscription browser 102 includes a user interface (UI) 106, one or more content handlers 112, a content manager 110, and an HTTP protocol stack 114. Each of the content handlers 112 can process information related to a network resource received by the client device 100 based on a respective type of the information. A network resource can be anything having an identity on a network, such as the network 116. For example, the network resource can be a service or a program or application included in a resource server 120. The network resource can also be a service, an image, a file, a document or a web page that is retrievable over the network 116, or the resource can present an entity that is not retrievable over the network 116, such as persons, companies, and written materials stored, for example, in a library or an archive.

The type of information related to a network resource can be any of the available MIME types, such as the "image/jpeg", "video/wmv", and "audio/midi", "txt/html" types, for instance. The content manager 110, which is coupled between the HTTP protocol stack 114 and the content handlers 112, can be configured to route the information related to the network resource received via the stack 114 from the network 116 to at least one of the content handlers 112 based on the type (e.g., the MIME type) of the information. Once the information is processed, the information is presented (e.g., displayed and/or played) on the client device 100.

The pub/sub communication protocol is a well-known asynchronous communication protocol in which commands are structured such that a sender of information via the protocol need not wait for a response from a receiver after the receiver is notified of the information. Although, some pub/sub protocols support responses to notification messages, these responses do not provide pacing under the control of the user. Indeed, current pub/sub protocols define no pacing parameters in any of their defined protocol messages. In a pub/sub protocol, senders of information (or publishers) post (or publish) messages/information/publications to the subscription service 118, rather than sending the messages to specific recipients. The subscription service 118 then sends a notification regarding the published information (or update thereto) or the published information itself to all authorized subscribers. In general, the subscription service 118 mediates the relationship between publishers and subscribers by receiving publication messages, sending notifications regarding the published information and/or the published information itself to subscribers, and enabling entities to manage lists of people or applications that are authorized to publish or subscribe.

Pub/sub communication protocols support a common set of commands (messages) from a functional standpoint (see, e.g., RFC 2779). These functional responses/commands include: 1) a publish command for allowing a presence entity (through a PUA/presentity) to update/provide its own published information (e.g. presence information such as status or contact information) to the subscription server 118; 2) a notify (or notification) command that allows the subscription server 118 to provide information related to published information to a WUA/watcher; and 3) a subscribe/unsubscribe command or request that allows a WUA/watcher to subscribe or unsubscribe to notifications related to specific published information.

Example types of pub/sub communication protocols include presence protocols, such as those described in "Request for Comments" (RFC) document RFC 2779 to Day et al., titled "Instant Messaging/Presence Protocol" (February 2000) and RFC 3921 to Saint-Andre, titled "Extensible Messaging and Presence Protocol (XMPP): Instant Messaging and Presence" (October 2004), each published and owned by the Internet Society. Another presence protocol is the Session Initiation Protocol (SIP) for Instant Messaging and Presence Leveraging Extensions (or SIMPLE). SIMPLE is an application of the SIP protocol (see RFC 3261 to Rosenberg, et. al., titled "SIP: Session Initiation Protocol"; IETF, June 2002) for server-to-server and client-to-server interoperability in instant messaging. For convenience, the exemplary embodiments described here employ a presence protocol as the pub/sub communications protocol. Nevertheless, the techniques described here can be performed using any of the pub/sub communications protocols described above.

The user interface component 106 of the subscription browser 106 may be configured to receive an identifier of published information 804 associated with a network resource. In a preferred embodiment, the identifier (hereinafter subscription identifier) may include a Uniform Resource Locator (URL) or a Uniform Resource Identifier (URI) used to describe and/or identify a network resource, object or other means of indicating a point of contact. The subscription identifier may identify the subscription service 118 and the network resource and be input through a control commonly referred to as a location bar. Alternatively, the identifier can be a link, such as the hypertext link displayed in a presentation space of the subscription browser 102. The link can be associated with a URI corresponding to published information related to the resource.

Once the subscription identifier is received by the user interface component 106, the subscription component 105 uses the subscription identifier to subscribe the client device 100 to published information 804 in the subscription service 118 using the pub/sub protocol. Once the subscription is established, the subscription component 105 enables subscription browser 102 to receive published information related to the network resource from the subscription service 118. The published information received from subscription service 118 may be contained in or referenced by notify commands and typically includes or references information/content retrieved from a tuple associated with the network resource pursuant to the outstanding subscription.

More specifically, the subscription component 105 includes a protocol agent component 103, one or more subscription handlers 104, and a subscription protocol stack 108. The protocol agent component 103 is coupled between the user interface 106 and the communications protocol stack component 108 (e.g., XMPP client protocol stack). The protocol agent component 103 is configured to receive the identifier from the user interface component 106. The protocol agent component 103 then communicates through the communications protocol stack component 108 with the subscription service 118 and uses subscription identifier to request a subscription to the published information 804 associated with the network resource. For example, the protocol agent component 103 can use a URI included in the location bar or a link for requesting a subscription to the published information 804 associated with the network resource. The subscription request can be included in a message (or command) included in the pub/sub communication protocol. The protocol agent component 103 then in one embodiment receives notifications associated with published information related to the network resource from the subscription service 118 through the communication protocol stack component 108.

In a preferred embodiment, the published information 804 is stored in a tuple. The tuple can represent any element used to store the published information 804 associated with a network resource. The published information 804 may include general contact information for the network resource, such as name, telephone number, email address, postal address, IP addresses or URLs associated with the resource, and the like, as well as data or content comprising the network resource. If the published information 804 associated with the resource also includes status information, then the published information 804 may be referred to as presence information. As used here, the tuple can also be a representation that maps field names to certain values to indicate that an entity or object (e.g., the network resource) includes certain components, information, and/or perhaps has certain properties.

According to an exemplary embodiment, the subscription browser 102 further includes a content handler component 104 coupled between the user interface component 106 and the content manager 110. The content handler component 104 is similar to the content handlers included in conventional browsers in that the content handler component 104 is configured to process information, e.g., the information included in the published information 804 related to the network resource, based on the type of the information routed to the handler component 104. The type can be any of the number of available Multi-purpose Internet Mail Extensions (or MIME) types.

Although an XMPP client protocol stack 108 is shown in the figure coupled to a corresponding XMPP-IM content handler 104 (described below), any appropriate protocol stack supporting one or more the asynchronous protocols described above or other protocols may be employed. For example, a protocol stack supporting the SIMPLE communications protocol (not shown) can be coupled to a SIP-SIMPLE content handler component 104b shown in FIG. 1 for processing SIMPLE commands. Alternatively, any CPP compliant protocol stack as specified in RFC 3859 (not shown) can be coupled to the Presence Information Data Format (PIDF) content handler 104c shown in FIG. 1 for processing CPP commands. Similarly a generic pub/sub client protocol stack (not shown) could be coupled to an appropriate generic pub/sub content handler (not shown).

Figure 2:
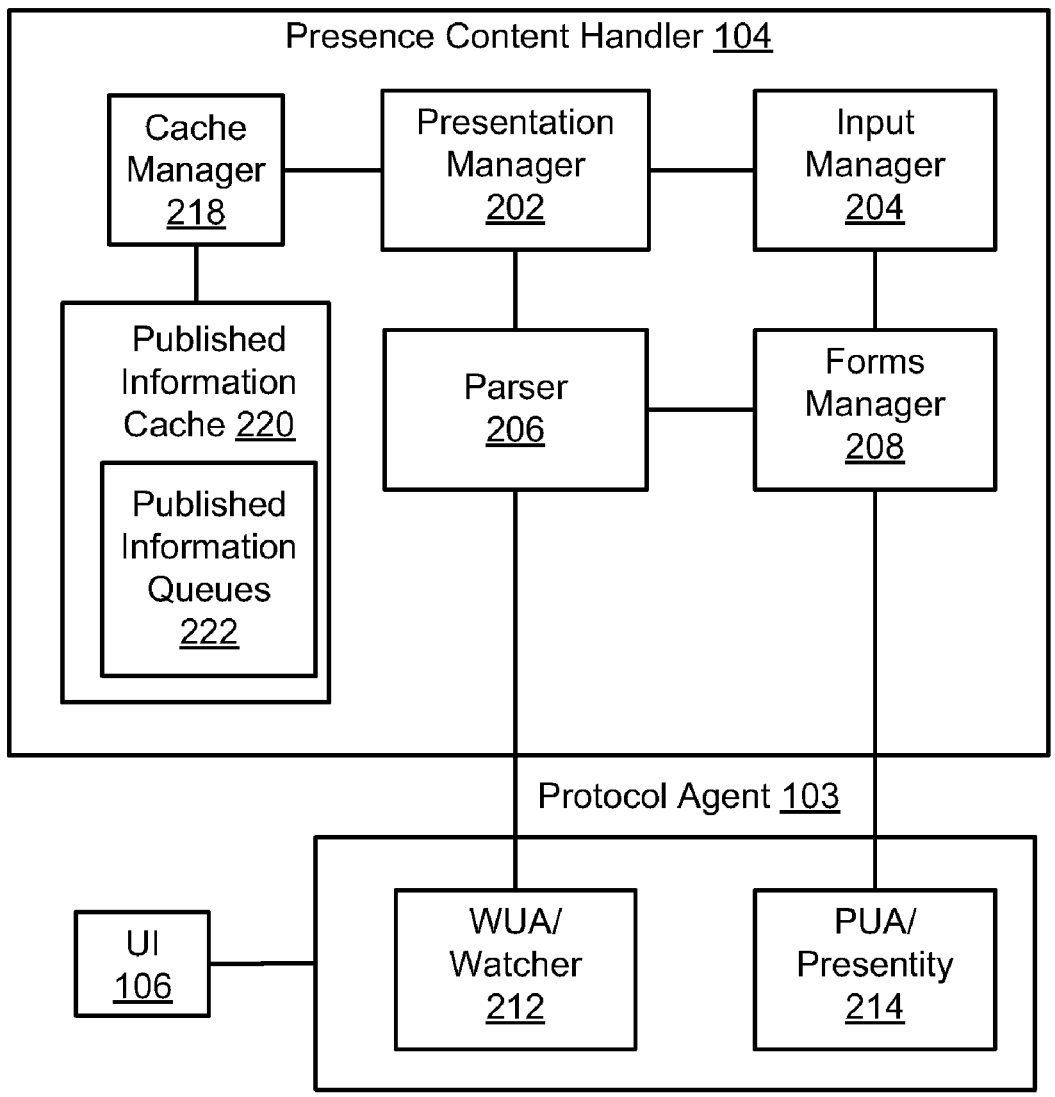
FIG. 2 illustrates an exemplary content handler component included in the subscription browser.

FIG. 2 illustrates an exemplary content handler component 104 included in the subscription browser 102 configured to process information having a "txt/xmpp-im" MIME type. Similarly, the content handlers 104b, 104c are configured to process information having "txt/sip-simple" and "application/pidf+xml" MIME types, respectively. Each of these content handlers is configured to support the browsing of network resources using an asynchronous communications protocol.

According to an exemplary embodiment, the content handler component 104 includes a presentation manager component 202 configured to present at least some of the published information 804 related to the network resource in a presentation space of the subscription browser 102.

The presentation manager component 202 can also be configured to convert at least some of the published information 804 related to the network resource into a format usable by a principal associated with the client. Such a principal can be a person using the subscription browser 102 to browse resources available via the network 116, or can be another application or program (e.g., running on the PC 100 shown in FIG. 4) configured to use the information 804.

The content handler component 104 also includes a parser component 206, coupled to the protocol agent 103, configured to receive the published information 804 related to the network resource and parse and/or convert the information into a format usable by the presentation manager component 202. For example, the published information 804 related to the network resource and the link can be received in an XML document. With such arrangements, the parser component 206 can be configured to use Extensible Stylesheet Language Transformations (XSLT) to transform the information related to the network resource into a form suitable for display in the presentation space.

According to another related exemplary embodiment, the content handler component 104 can also include an input manager component 204 configured to receive the identifier from the user interface component 106 in response to an entering of the identifier in a control component of the client, such as the location bar included, or a selection of a link displayed in the browser 102. The input manager component 204 can also be configured to receive form input entered via the user interface 106 corresponding to a form field element (not shown) associated with a form object that may be included in the information related to the network resource 402 received via the communications protocol stack 108. The form object can be identified in the information stream related to the resource 402 by the parser component 206, which can then register the form object, the related form field element, and any associated actions included in the information related to processing the form object, with a forms manager component 208 included in the content handler component 104. The forms manager component 208 can be configured to manage the form object and the form field element identified by the parser component 206. In addition, the forms manager component 208 can be configured to receive the form input corresponding to the form field element from the input manager component 204, and associate the received form input with the form field element.

The skilled reader will understand that the presentation manager 202, input manager 204, parser 206, and forms manager 208 components of the client/browser 102 described above are similar to like components included in conventional browsers that exchange information with other network entities using synchronous protocols, such as HTTP, but each of the components includes enhanced functionality to support the browsing of network resources using an asynchronous communications protocol.

The protocol agent component 103 may include a watcher user agent (WUA) 212 and an optional presentity user agent (PUA) 214. The WUA/watcher 212 may be configured to receive the subscription identifier received from user interface component 106 and use the protocol stack 108 to send a request to the subscription service 118 for a subscription to one or more tuples containing the published information 804, and to receive the published information 804 in the form of a notification/notify message/command.

The PUA/presentity 214 may be configured to publish information to the subscription service 118 related to the network resource. The subscription service 118 can then send this information to other subscribers pursuant to their subscriptions to the tuple associated with the network resource. The subscription service 118 can be hosted on a standalone server (as shown), on a number of servers arranged throughout the network working, on the resource server 18, or any combination of dedicated subscription servers and resource servers 18. The PUA/presentity 214 may also be configured to publish information to other subscription services or to subscription service 118 where the published information is unrelated to the network resource 120.

It should be understood that placing all the above functionality in the content handler component 104 is a design decision. Some of the functions may extend beyond that normally associated with a content handler and may be distributed among other components in the browser 102. The present design is preferred when support for subscription browsing needs to be added as one plug-in to a browser platform. A browser built specifically for subscription browsing would more than likely distribute the components and function differently. It should be also understood that an HTML content handler can be extended to support subscription browsing according to the principals disclosed herein.

Although in a preferred embodiment, the method and system is described in terms of a pub/sub communication protocol, any other type of asynchronous communications protocol may be used whose commands are structured such that a sender of information via the protocol, e.g., the subscription browser 102, need not wait for a response from a receiver, e.g., the subscription service 118, after the receiver is notified of the information. Examples of asynchronous communications protocols include presence protocols, such as those described in "Request for Comments" (or RFC) document RFC 2779 to Day et al., titled "Instant Messaging/Presence Protocol" (February 2000) and RFC 3921 to Saint-Andre, titled "Extensible Messaging and Presence Protocol (XMPP): Instant Messaging and Presence" (October 2004), each published and owned by the Internet Society. Another asynchronous presence protocol is the Session Initiation Protocol (SIP) for Instant Messaging and Presence Leveraging Extensions (or SIMPLE). SIMPLE is an application of the SIP protocol (see RFC 3261 to Rosenberg, et. al., titled "SIP: Session Initiation Protocol"; IETF, June 2002) for server-to-server and client-to-server interoperability in instant messaging.

The subscription browser 102 effectively enables a Web service, such as the subscription service 118, to send published information to the browser 102 without waiting for a response from the browser 102, in some instances, the published information sent by the subscription service 188 may arrive at the client device 100 too quickly for user (or application) to view or process the information.

According to the exemplary embodiment, a method and system are provided for presenting published information 804 in the subscription browser 102 by providing a configurable pace setting that controls the rate at which the published information is presented.

Figure 3:
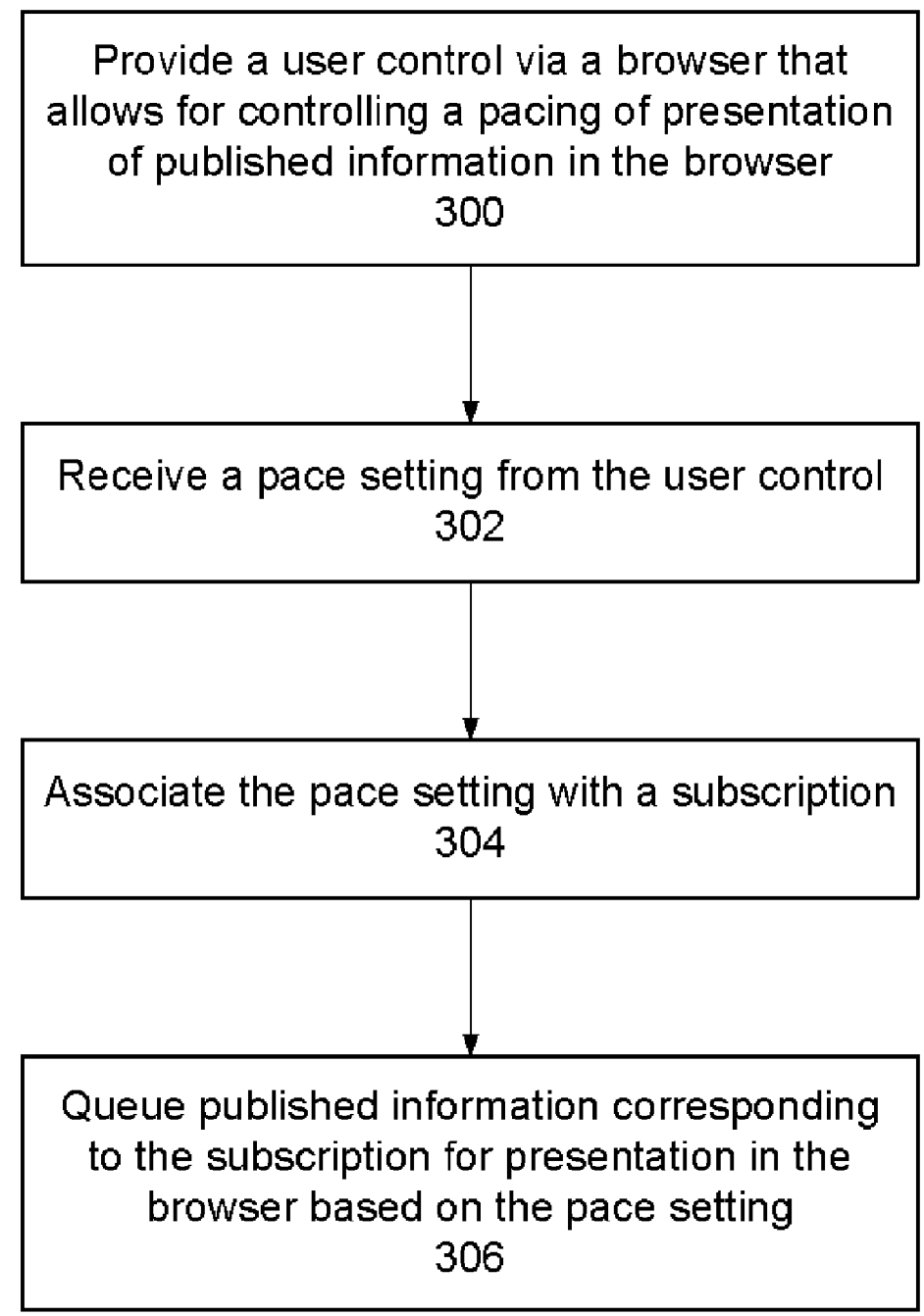
FIG. 3 is a flow diagram illustrating a process for presenting published information in the subscription browser according to a preferred embodiment.

FIG. 3 is a flow diagram illustrating a process for presenting published information in the subscription browser according to a preferred embodiment. In a first embodiment, the process described in FIG. 3 can be performed by the subscription browser 102 in the client device 100. In a second embodiment, the process described in FIG. 3 can be performed by the subscription service 118.

The process begins in step 300 by providing a user pacing control via the subscription browser 102 that allows for controlling a pacing of presentation of published information in the browser. As used herein, the term pace refers to a time interval between presentation and/or delivery of the published information and/or instances thereof. As described below, the time interval or pace may be predefined (e.g., "30 sec.") or user controlled via commands (e.g., "pause/play", "next").

In the first embodiment, the user pacing control is provided by displaying the user pacing control in the user interface component 106 of the subscription browser 102. In the second embodiment, the user pacing control is provided from the subscription service 118 by displaying the user control in a user interface portion of browser content provided by a service/server, e.g., the subscription service 118 or resource/application server 120, and displayed in the browser 102. For example, by displaying buttons on a web page served by service/server 118 or 120 and displayed in the browser 102.

Figure 4:
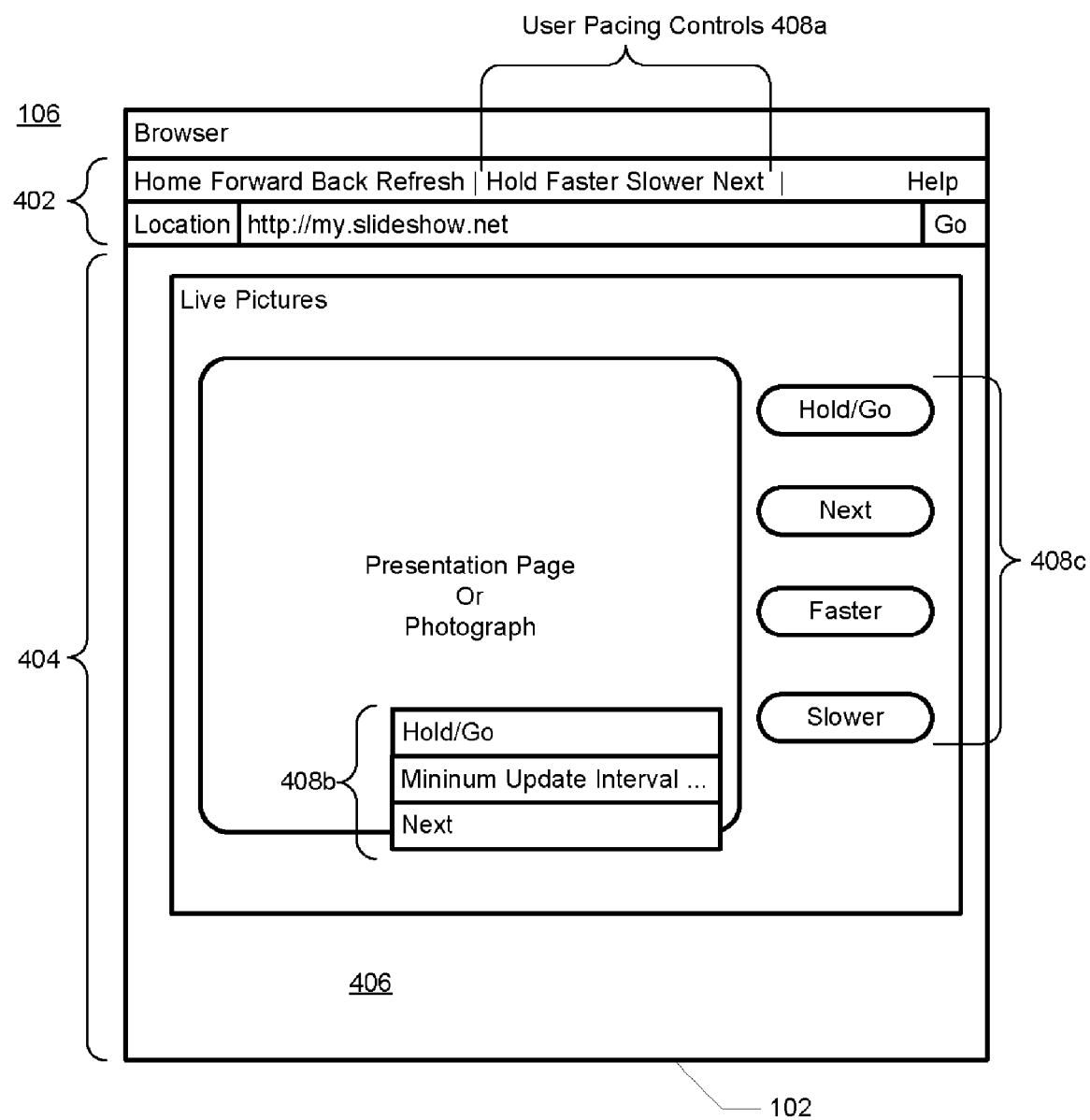
FIG. 4 is a diagram illustrating examples of user pacing control displayed in a user interface component as well as user controls displayed with content provided by a subscription service and displayed by the browser.

FIG. 4 is a diagram illustrating examples of the user pacing control displayed in a user interface component as well as the user pacing controls displayed with content provided by the subscription service 118 and displayed by the browser 102. The user interface component 106 of the browser 102 includes a toolbar/menu area 402 for displaying user-accessible features, and a display area 404 for displaying browser content 406. In one embodiment, the user pacing control 408a may be displayed as a menu item in the toolbar/menu area 402 of the user interface component 106. In another embodiment, the user pacing control 408b may be displayed as a pop-up context menu of the user interface component 106. In a further embodiment, the user pacing control 408c may be displayed with the content provided from the service/server 804 or 120, which is displayed in the display area 406 of the browser 102.

Regardless of where the user pacing control (collectively depicted as element 408 in the accompanying drawings) is provided, the user pacing control 408 may comprise a set of individual graphic or text controls for entering a pacing setting. In a preferred embodiment, the user pacing control 408 includes a first control for allowing a delaying of the presentation of published information, a second control for allowing a presentation of a next instance of published information, a third control for allowing a specification of a minimum time interval between presentation of instances of published information, and a fourth control for allowing a specification of a number of instances of published information that are sent or presented in a batch.

In a preferred embodiment, the first control for allowing a delaying of the presentation of published information may be implemented as a toggle button or switch that when activated causes presentation or transmission of published information to stop and start. This control is shown in FIG. 4 as a "Hold/Go" item, but may be labeled "Pause/Play", "Stop/Resume", "Stop/Start and so on.

The second control for allowing the presentation of the next instance of published information can include an acknowledgement control that when activated causes the next instance to be delivered or transmitted. This control is shown in FIG. 4 as a "Next" item.

The third control for allowing the specifying of a minimum time interval may comprise a "Fast" control that speeds up the delivery or transmission of instances of published information, a slow control that slows down the delivery or transmission of the instances, or both. This control is shown in FIG. 4 as "Faster" and "Slower" items. Alternatively, this control may be represented by a single item, such as the "Minimum Update Interval" item displayed in the context menu.

The fourth control (not shown) for allowing a specifying of a number of instances of published information that are sent in a batch provides an option to have instances of published information sent in bundles presented based on the number of instances received (e.g., a request to deliver or present a bundle of instances when the bundle size reaches 10) or based on time (e.g., deliver or send a bundle of instances every 5 minutes no matter how many there are).

The user pacing control 408, however, may be implemented using other types of user interface embodiments and remain within scope of the preferred embodiment. For example, a mouse may be use to implement the Holds/Go action, where a click and hold of one of the mouse buttons pauses the presentation of the published information 804, and a release of the mouse resumes the presentation. In "acknowledgment" mode, a mouse click on the presented subscription data may be used to request the next instance of published information. As another example, a double-click of a left mouse button may be used to decrease the minimum time between published information presentations (i.e., faster updates), while a double-click of the right mouse button may be used to make the updates slower. As another example, a clockwise mouse gesture maybe used to speed up presentation of published information, while a counter-clockwise mouse gesture maybe used to slow down the presentation. As a final example, a spin of the mouse scroll wheel up may be used to speed_up the presentation, while a spin down slows down the presentation.

Referring again to FIG. 3, after the subscription browser 102 provides the user pacing control, a pace setting input from the user pacing control 408 is received in step 302. The pace setting input may then be mapped to a pace setting command or command/value pair, such as a stop command, a resume command, an acknowledgement command, or a time interval value. In the embodiment where the pace setting control 408 is displayed in the user interface component 106 of the browser 102, the pace setting input is used by the browser 102 to control the presentation of published information. In the embodiment where the pace setting control 408 is provided by the service/server 118 or 120, the pace setting is transmitted from the browser 102 to the subscription service 118.

As the browser 102 may have received many subscription identifiers, the browser 102 may have initiated multiple subscriptions with the subscription service 118. In addition, the client device 100 may have multiple open windows for the browser 102. Therefore, after the pace setting is received, in step 304 the pace setting is associated with a current subscription. The current subscription may be the subscription that is associated with the browser window that is active or that has focus, or the current subscription may be associated with a tab or other region of the active browser window.

After the pace setting is associated with a current subscription, in step 306, published information corresponding to the subscription is queued for presentation in the browser 102 based on the pace setting. In the first embodiment where the pacing of the published information is controlled by the browser 102, the published information is transmitted by the subscription service 118 normally, but is then queued in the client device 100 by the browser 102 after receipt, if necessary. As described above, the published information queued by the browser can include all or a portion of the information associated with one or more notifications received from the service 118. It is expected that, in typical cases, published information will be presented in the order in which the associated notifications are received.

In some cases published information may be aggregated as mentioned earlier, divided into separate presentable instances prior to presentation or may be filtered. For example, an application that displays network monitoring statistics may allow the user to define a time interval over which utilization of a network path is to be displayed as an aggregate value such as the mean throughput. The application may achieve this operation using an Application Programming Interface (API), such as the cache manager API 500 described below in conjunction with FIG. 5B. Such an API can be callable by the application's client-side scripting or plug-in code. In other embodiments, the cache manager API 500 may be extended to allow an application to specify filtering or grouping criteria for cached items. Similar support for aggregating and/or dividing instances of published information may be provided on the subscription server 118 as well.

In the second embodiment, where the pacing of the presentation of the published information is managed by the subscription service 118, the published information can be queued on or by the subscription service 118 prior to transmission to the browser 102, if necessary. Preferably, the published information to be paced for presentation in the browser 102 can be queued in respective notifications to be sent by the subscription service 118. Such an arrangement can require the browser 102 to have little or no logic for pacing the presentation of the published information—the pace can be substantially the pace at which the notifications are sent from the service 118.

Alternatively, as described above, the published information can be included in one or more notification messages including additional pacing information instructing the browser 102 or an application running in the browser how the published information is to be presented. To achieve this aggregation, an additional parameter may be provided along with the pace setting to establish the number of publish commands to aggregate prior to sending the published information to the client. The server may send separate notifications for each publish command or may be instructed to send one aggregated notification as specified by yet another additional pace setting parameter. Additional browser logic, such as a JAVA script, can process this pacing information to divide and/or aggregate instances of published information to present the instances at the requested rate. For example, the application in the browser may be designed to enable dividing and presenting portions of the published information associated with a single notification at a particular rate, or the application can be configured to combine and present the published information associated with multiple notifications at the requested rate. Such a browser application can be configured to instruct the browser's cache manager to combine the queued information through the cache manager API 500 described in greater detail below.

Two user scenarios will now be provided to further illustrate operation and advantages of the preferred embodiment. In the first scenario, assume that Joe Security is supposed to watch the status and associated information for a badge reader at his office, and the information read by the badge reader is published to the subscription service 118. Joe is often busy with other things, so he can't always see changes as they occur. Therefore, Joe has configured his browser's subscription to the badge reader information so that when the information is updated and a notification is generated, the notifications including the information can be frozen until presentation of the information is acknowledged. Joe's browser won't send an acknowledgement until Joe acknowledges that he's seen the information. After joe sends an acknowledgement, the subscription service sends the next portion of badge reader information, perhaps in a second instance of published information.

In the second scenario, assume that a University professor is publishing a slide show presentation in real-time to the subscription service 118. A student, Joe, is watching a slide presentation on his laptop via the subscription browser 102, as shown FIG. 4. Sometimes the professor presents a slide very quickly. Joe gets distracted so he often misses seeing slides in these situations. Therefore, Joe starts the presentation and hits the "Hold" button provided by the browser 102. This way he won't miss the first slides if he isn't paying attention when the slide presentation starts. He also presses the "Slower" button in the window/tab toolbar until the screen informs him that each slide will appear for a minimum of 20 seconds. When he hears the professor's voice, he presses the "Go" button (which was the Hold button but was toggled to "Go"). The slides change as the professor changes them, but if the professor spends less than 20 seconds on one the next slide will be queued by the browser until Joe has seen the current one for at least 20 seconds. If he is ready to move on before the 20 seconds is up, he can indicate "Go" to override the timer for this slide. If he wants to view a slide longer than 20 seconds or the length of time the professor displays it (if longer than 20 sec), Joe can "Hold" the slide. If 20 seconds is not the right time period, Joe can adjust the time period, by pressing the Faster and/or Slower buttons.

Thus, the embodiments for displaying published information 804 in a browser such that the rate of presentation of published information is controlled as disclosed herein provides several advantages. One advantage is that a user can be provided control through a variety of GUI mechanisms so that bursty updates to the published information 804 can be paced, allowing the user to view/process them all. A further advantage is that the pace of presentation of published information can be browser specific, rather than controlled by network layer code. A further advantage is that published information caching of the present embodiments may be used together with network layer flow control and application level pacing.

Referring again to FIG. 2, a preferred embodiment of an architecture for queuing published information on the client device 100 by the browser 102 is shown. The queuing of published information may be accomplished through the use of a cache manager component 218 coupled to the presentation manager 202, and a published information cache 220 coupled to the cache manager component 218. The cache manager component 218 may be configured to manage the pace of the presentation of published information per the pace setting input. When presentation of published information must be delayed, the cache manager component 218 stores the published information in the published information cache 220. In a preferred embodiment, the published information cache 220 may include a respective published information queue 222 for each active subscription, where each published information queue 222 is used to store the published information received for the corresponding subscription. In the second embodiment where the queuing of published information is performed by the subscription service 118, the cache manager 218 and published information cache 222 may be implemented on or by the subscription service 118.

Figure 5A:
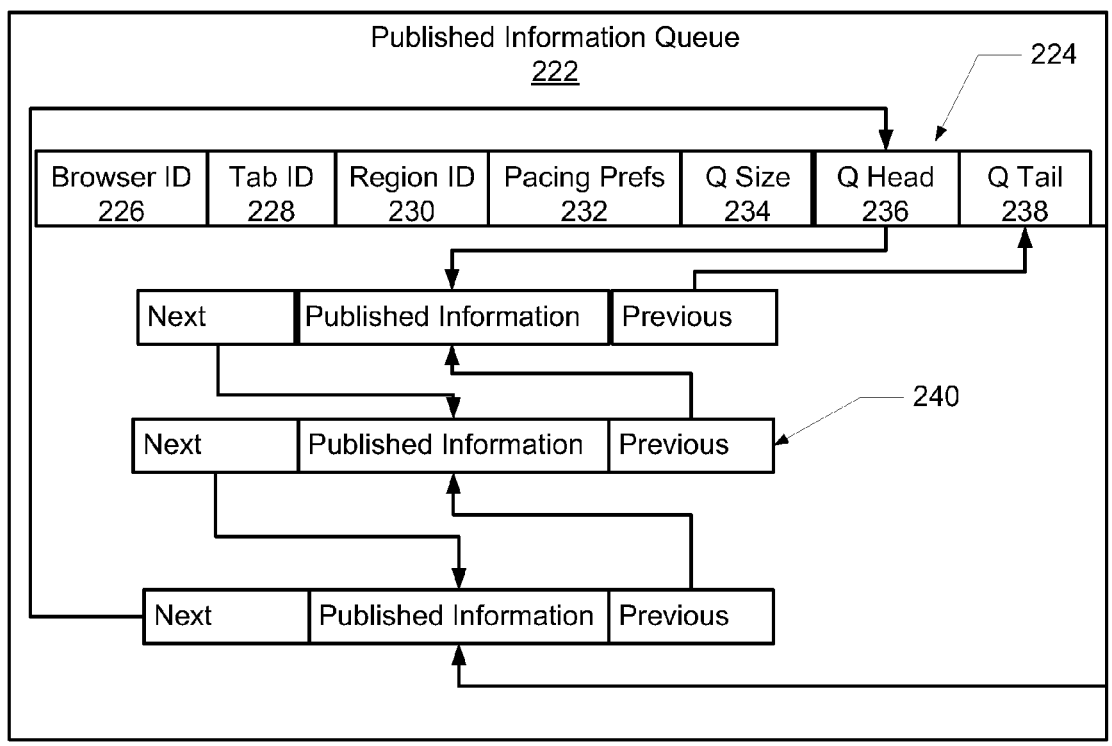
FIGS. 5A and 5B are diagrams illustrating the published information cache and the cache manager in further detail, respectively.
Figure 5B:

FIGS. 5A and 5B are diagrams illustrating the published information cache 220 and the cache manager 218 in further detail, respectively. FIG. 5A is a block diagram illustrating an exemplary queue 222 associated with a subscription. Each queue 222 in the published information cache 220 is associated with a data record 224 that maps the queue 222 to the browser instance, window or tab, and region if more than one subscription is associated with displayed content. Therefore, the queue data record 224 may include a browser ID field 226 for identifying the browser instance, a tab ID field 228 for identifying the browser tab, and a region ID field 230 for identifying the region.

In a preferred embodiment, the cache manager 218 may enable a user to configure pace setting preference for each subscription through the user interface component 106. Once a subscription-specific pace setting preference has been provided, it may be stored in a pace setting preference field 232. The queue data record 224 may also include a queue size field 234 for indicating the number of records 240 in the queue.

In a preferred embodiment, the published information queue 222 is a first-in-first (FIFO) and published information is processed in the order that it is placed in the queue 222. In an exemplary embodiment, the published information queue 222 is implemented as a two-way linked list, where the queue data record 224 includes a queue head field 236 for storing a pointer to the beginning of the queue 222, and a queue tail field 238 for storing a pointer to the end of the queue 222. Each record 240 in the queue 222 includes a pointer to the next record 240 and a pointer to the previous record. The number of records that can be held in the queue 222 and the size of the queue 222 are dependent on system resources and on the type of published information received.

In a preferred embodiment, the queue manager 218 is implemented as an API that is used by the presentation manager 202 to control the pace of presenting published information and to manage queues. FIG. 5B is a block diagram showing an exemplary API 500 provided by the cache manager 218, which can be used by the presentation manager 202 and content handlers 104 to process the pace setting preferences 232 and manage the published information queues 222. API functions are shown for implementing hold, go, next, and set interval commands as well as for setting the pace setting preferences 232. Preferably, default values for the pace setting preferences 232 can be set for the browser 102 as a whole (e.g., via a function "SetGlobalPacing(Pacinginfo)", but can be overridden by the preferences set for a specific browser window (SetWindowPacing), browser tab (SetTabPacing), or region (SetRegionPacing). Window or tab preferences can be overridden by preferences set for a specific subscription. Note also, that pace setting preference 232 can be set and remembered for a URL, domain, or sub-domain (SetURLPacing).

Figure 6:
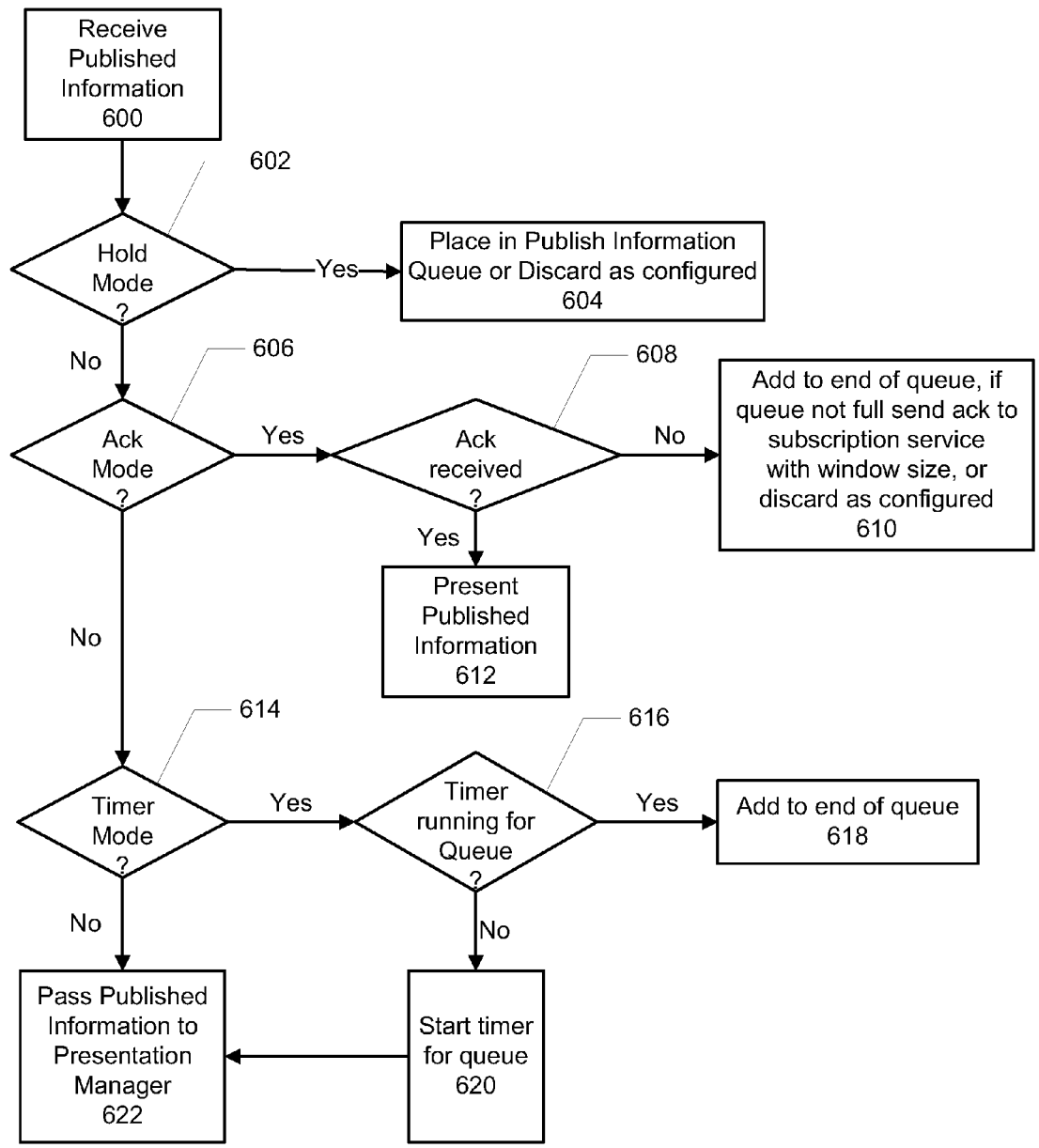
FIG. 6 is a flow diagram illustrating the process performed by the subscription browser when a notification is received.

FIG. 6 is a flow diagram illustrating the process performed by the subscription browser 102 when published information is received. The process begins in step 600 when a notify command associated with a current subscription is received from the subscription service 118 and passed to the presentation manager 202. In step 602, the presentation manager 202 determines from prior inputs to the user pacing control 408 whether presentation of the published information for the current subscription is in a hold mode. If so, then in step 604, the presentation manager 202 sends the published information to the cache manager 218 for storage in the published information queue 222 associated with the subscription. The current hold command may optionally also be sent to the subscription service 118 (step not shown).

In step 606, the presentation manager 202 determines whether presentation of published information for the current subscription is in an acknowledge mode. If so, then in step 608 the presentation manager 202 determines whether an acknowledgment has been received from the user pacing control 408. If not, then in step 610 the published information is added to the end of the queue 222 if the queue is not full, and an acknowledgment command is sent to the subscription service 118 with an indication of a size of the browser window if the subscription service 118 supports acknowledgements. The published information may otherwise be discarded if the pace setting preferences are so configured. If an acknowledgment has been received in step 608, then in step 612 the presentation manager 202 prepares the contents of the published information for presentation and passes the prepared data to the user interface 106 for display.

It should be noted that presentation of the published information may include displaying/playing the published information 804 in or by the browser 102 or other appropriate application. In some circumstances, however, presentation of the published information may include changing a parameter or characteristic (e.g., color, font, position, etc.) of information already presented in the browser, rather than displaying new published information 804.

In step 614, the presentation manager 202 determines whether presentations for the current subscription are in an interval timer mode. If so, then in step 616 the presentation manager 202 determines if an interval timer associated with the queue 222 is currently running. If so, then in step 618, the published information is added to the end of the queue if the queue is not full, where the published information awaits its turn to be presented. An optional step is to also send the timer value to the subscription service 118 to synchronize the presentation/delivery of the published information between the client device 100 and the subscription service 118.

If the interval timer for the queue is not running, then in step 620, the presentation manager 202 starts the interval timer for the queue 222. If the interval timer is not running or the subscription is not in interval time mode (as determined in step 614), then in step 622, the presentation manager 202 prepares the contents of the published information for presentation and passes the prepared data to the user interface 106 for display.

Figure 7:
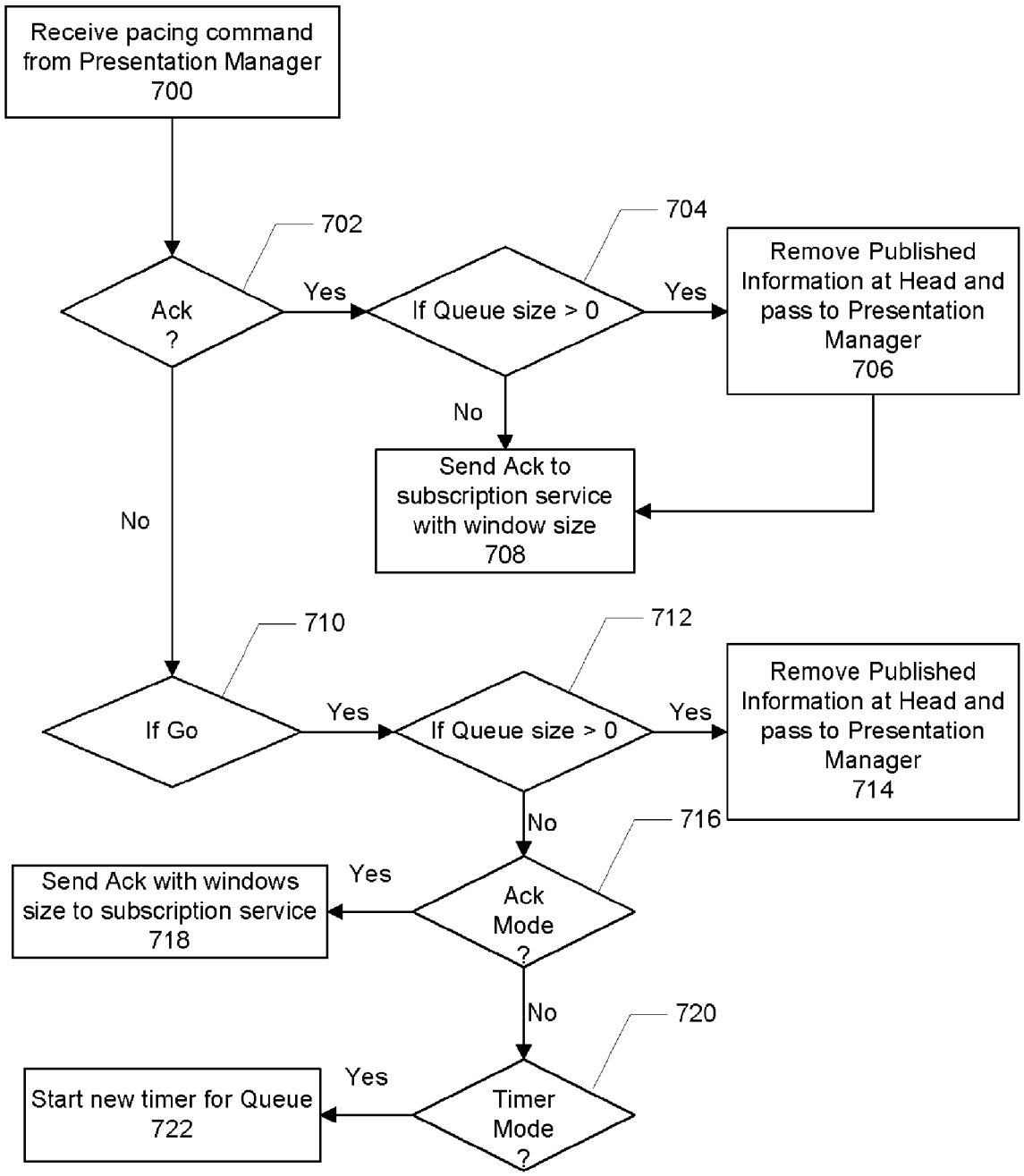
FIG. 7 is a flow diagram illustrating the process performed by the cache manager for managing the published information queues in response to input from the user pacing control.

FIG. 7 is a flow diagram illustrating the process performed by the cache manager 218 for managing the published information queues 218 in response to input from the user pacing control 408. The process begins in step 700 when the cache manager 218 receives the pacing command from the presentation manager 202. In step 702, the cache manager 218 determines whether input from the pacing control is an acknowledgement (e.g., an "ack"). If so, then in step 704 the cache manager 218 determines if the size of the queue 222 for the subscription is greater than 0 (not empty). If so, then in step 706, the published information at the head of the queue 222 is passed to the presentation manager 202 for presentation. An acknowledgment command may also be sent to the subscription server 118 along with the browser window size in step 708.

In step 710 the cache manager 218 determines whether a Go, Resume, or Play command from the user pacing control 408 has been received. If so, then in step 712 the cache manager 218 determines if the size of the queue 222 for the subscription is greater than 0 (not empty). If so, then in step 714, the published information at the head of the queue 222 is passed to the presentation manager 202 for presentation. If it is determined that the queue 222 is empty in step 712, then the cache manager 218 determines in step 716 whether presentation of published information for the current subscription is in an acknowledge mode. If so, then in step 718 an acknowledgment command is sent with a browser window size to the subscription service 118 to trigger the presentation of the next instance of published information. If not in acknowledgment mode in step 716, then the cache manager 218 determines in step 720 whether presentations for the current subscription are in an interval timer mode. If so, in step 722 the cache manager 218 starts an interval timer for the queue 222 to ensure the current display of published information 804 remains displayed for the specified duration.

Figure 8:
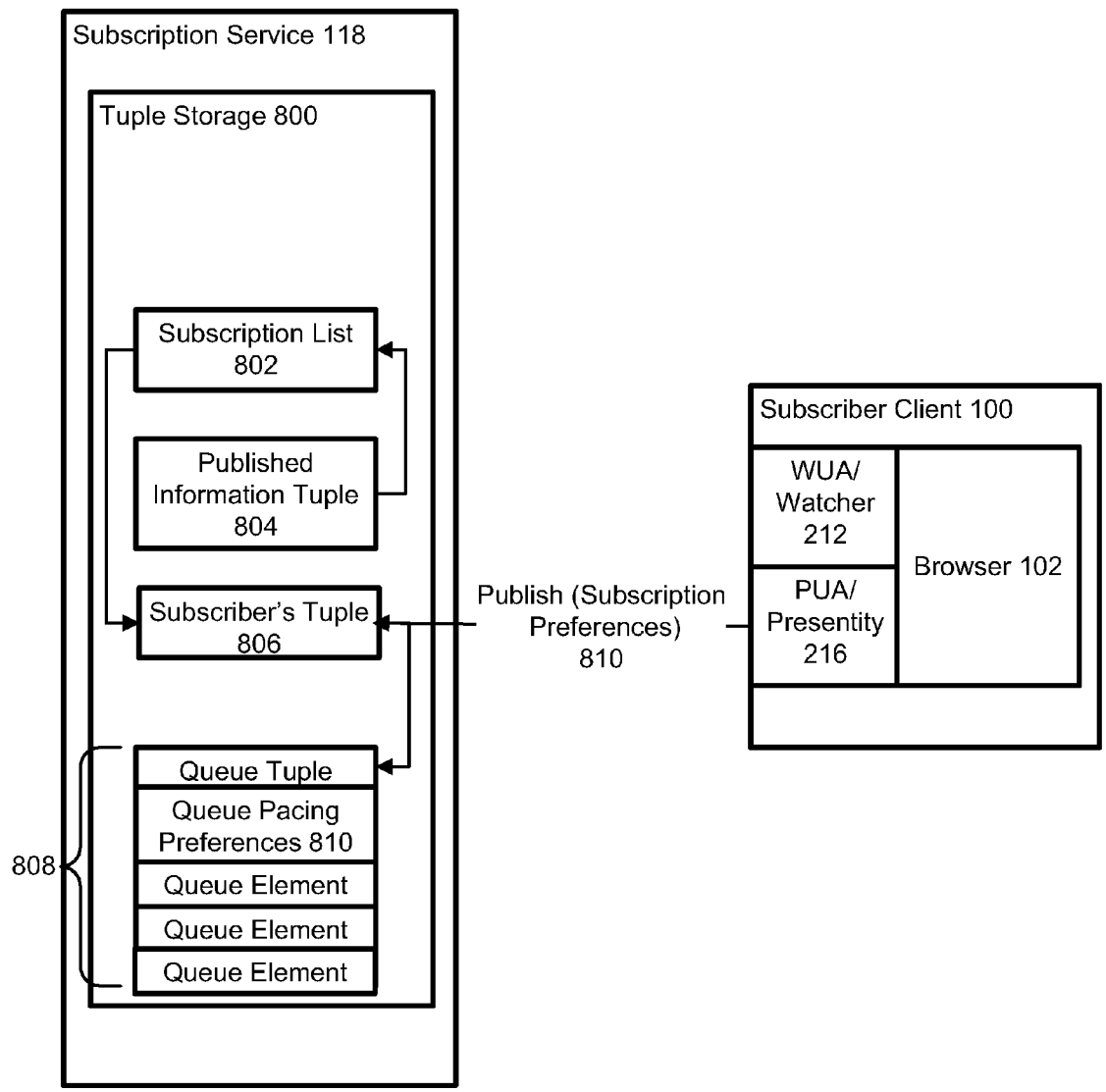
FIG. 8 is a diagram illustrating an exemplary embodiment for setting the pace setting preference on the subscription service.

The processes described above were described as being performed by the subscription browser 102 on the client device 100. As stated previously, however, in an alterative embodiment, the subscription service 118 may control the rate of published information sent from the subscription service 118 to subscription browser 102. FIGS. 8-10 are diagrams illustrating such processes. The two embodiments may work together as indicated and described in conjunction with FIGS. 6 and 7.

FIG. 8 is a diagram illustrating an exemplary embodiment for setting the pace setting preference on the subscription service 118. In this embodiment, the subscription service 118 includes tuple storage 800, which is configured to store a subscription list 802, published information 804, a subscriber's tuple 806, and a published information queue 808. The subscription list 802 is a list of subscribers to a current subscription for the published information 804. The published tuple 804 contains information published by the publisher. The subscriber's tuple 806 contains information regarding the user of client device 100 and/or the subscription browser 102 that has subscribed to the published information 804. Note that the tuple being published references the subscription list 802, which references the subscriber's tuple 806, which in turn references the subscriber's queue 808 associated with the current subscription. The published information queue 808 stores published information addressed to the subscription browser 102.

Figure 9A:
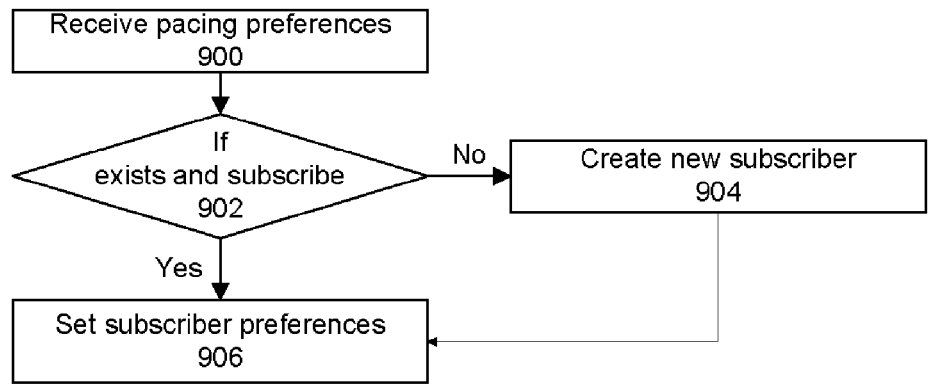
FIGS. 9A and 9B are flow diagrams illustrating the process performed by the subscription service in response to receiving commands from the subscription browser.
Figure 9B:
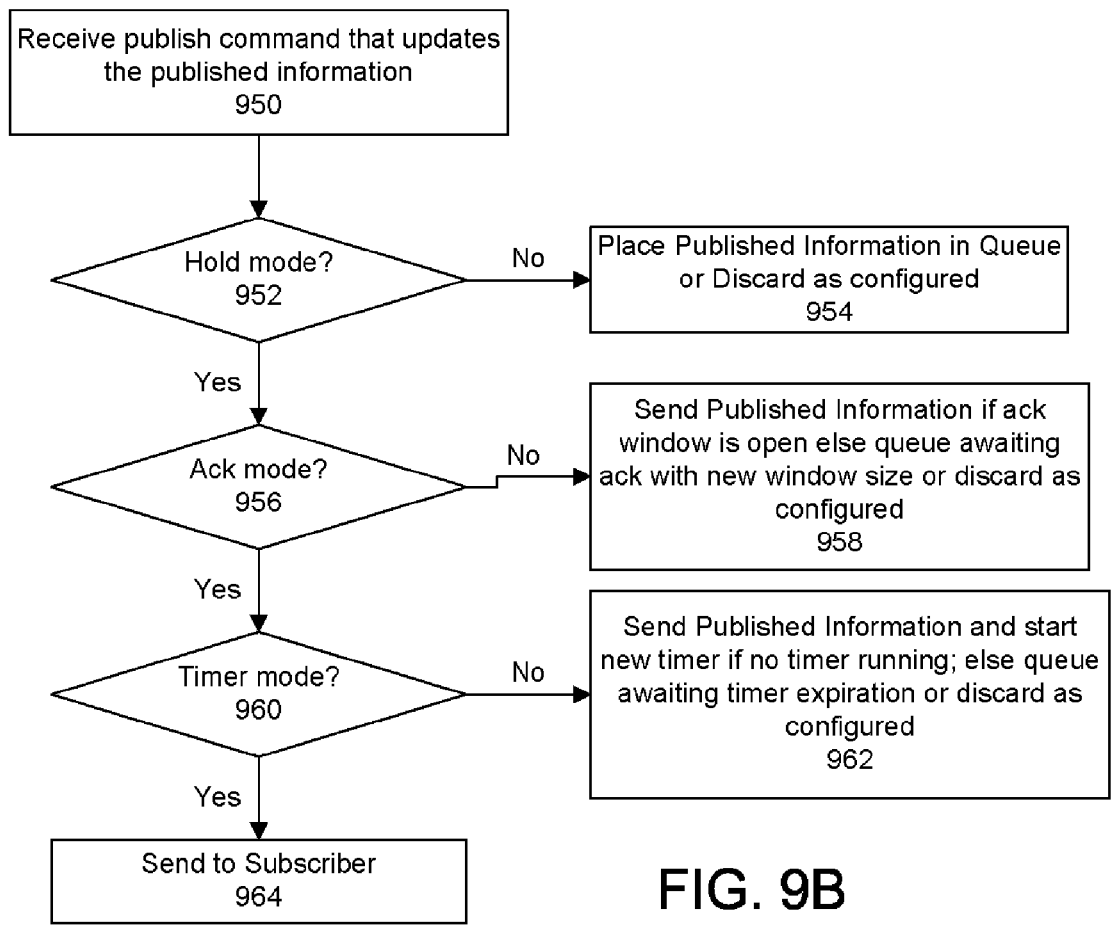
Figure 10:
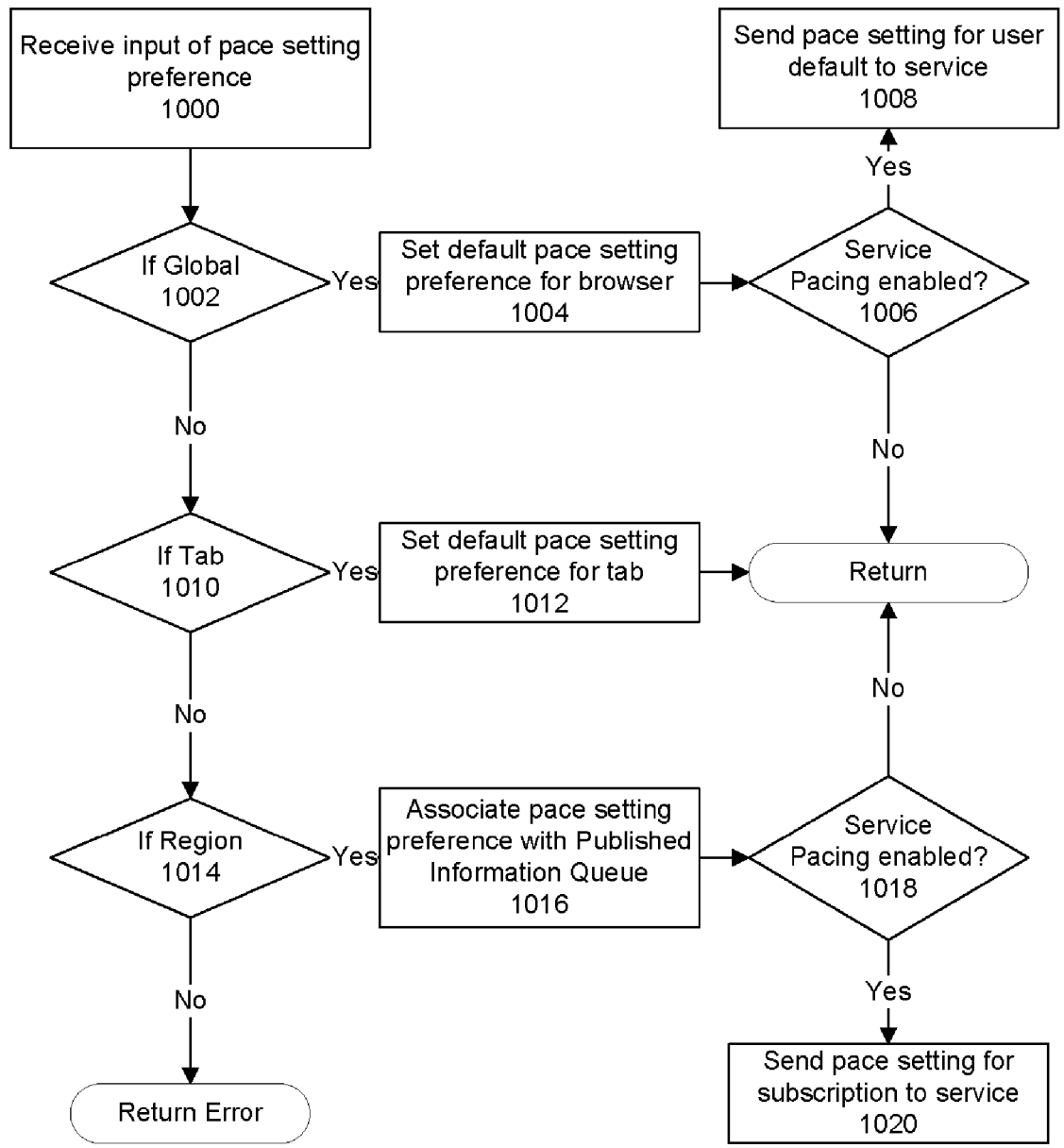

FIGS. 9A and 9B are flow diagrams illustrating the process performed by the subscription service in response to receiving commands from the subscription browser 102. FIG. 9 is a flow diagram illustrating the process performed by the subscription service 118 for setting the pace setting preference sent from the subscription browser 102. In step 900, the subscription service 118 receives the pace setting preference 810 from the browser 102. The pace setting preference 810 may be received via a publish command from the publisher or subscriber; a subscribe command, or a notify command response sent from the browser's PUA/presentity 216. In a preferred embodiment, the pace setting preference 810 also includes an identifier of the published information 804, although the setting may specify a global setting not particular to any specific subscriber or published information.

If the pace setting preference 810 was sent via a subscribe command, then in step 902 the subscription service 118 determines if the entity is already subscribed to the published information 804 corresponding to the identifier. If not, then in step 904 the subscription service 118 adds the entity to the subscription list 802 and allocates the published information queue 808 for the subscription. If the entity does not have a subscriber's tuple 806, then one may be created for the subscriber's tuple.

If the entity is already subscribed to the published information 804 corresponding to the identifier in step 902 or has been subscribed to in step 904, then in step 906, the pace setting preference is stored in the pacing preferences 810.

FIG. 9B is a diagram illustrating the process performed by the subscription service 118 for processing a publish command for a subscriber using the pace setting preference 810. In step 950 a publish command is received from a publisher that updates the published information 804. In response to the publisher updating the published information 804, a notification is generated. Since the subscriber, i.e., the subscription browser 102, is on the subscription list 802, the published information will be sent to the browser 102 included in or referenced by a notify command. Prior to transmitting the published information to the browser 102, however, the subscription service 118 accesses the pace setting preference 810 to determine the current mode of the browser 102. Note also, that subscription service 118 may aggregate or divide the published information for delivery in or reference by one or more notify commands using additional pacing setting parameters (or preferences) as described above.

In step 952, if the browser 102 is in hold mode, then in step 954, the subscription service 118 places the published information in the queue 808 or discards it as specified by the pacing preference 810.

In step 956, if the browser 102 is in an acknowledge mode, then in step 958, the subscription service 118 sends the published information to the browser 102 if an "ack" window is open. Otherwise the published information is queued awaiting an acknowledge command with a new window size, or the published information may be discarded as specified by the pacing preference 810.

In step 960, if the browser 102 is in timer mode 960, then in step 962, the subscription service 118 sends the published information to the browser 102 and starts a new timer based on the specified time interval if no timer is currently running. Otherwise, the published information is queued awaiting timer expiration or the published information is discarded as configured.

If the browser 102 is not in the hold, acknowledge, or timer mode, then in step 964, the subscription service 118 sends the published information to the subscription browser 102.

As stated above, the client device 100 may have multiple open windows for the browser 102. Each browser window may have different tabs and/or regions. According to a preferred embodiment, the user may set different pace setting preferences for the browsers' windows, the tabs, and the regions. Thus, a pace setting input may be associated with one or more of the opened browsers' windows, associated with one or more of the browsers' tabs, associated with one or more regions of the browser windows based on the pace setting preferences.

FIG. 10 is a flow diagram of the process performed by the subscription browser 102 for receiving and setting pace setting preferences. In step 1000, the input of the pace setting preference is received. In step 1002, it is determined whether the pace setting preference is to be applied globally to all the subscriptions associated with one or more the browser windows. If so, then in step 1004, a default pace setting preference for all of the browser windows is set. In step 1006, it is determined whether pacing control by the subscription service 118 is enabled. If so, then in step 1008, the pace setting preference for the user is sent to the subscription service 118.

In step 1010, it is determined whether the pace setting preference is to be applied to subscriptions appearing in one or more browser tabs or browser windows. If so, then in step 1012, a default pace setting preference for browser tabs is set. Pace settings may be sent to the subscription service for each subscription in the affected tabs and/or windows (not shown).

In step 1014, it is determined whether the pace setting preference is to be applied to subscriptions appearing within a region of one or more the browser windows or tabs. If so, then in step 1016, the pace setting preference is associated with the published information queue corresponding to the subscription in the region. In step 1018, it is determined whether pacing control by the subscription service 118 is enabled. If so, then in step 1020, the pace setting preference for the user is sent to the subscription service 118.

FIGS. 8-10 show the pace setting preference being set via a publish command sent from the browser 102 to the subscription service 118. However, two other embodiments for publish-subscribe protocols with commands containing pace setting preference are also provided. FIGS. 11-14 are diagrams illustrating various other examples of publish-subscribe protocols with commands containing subscription pace settings and/or pace setting preferences. In a preferred embodiment, a "pace" option command is used in the examples.

In the second embodiment, the pace setting/pace setting preference may be set in a subscribe command or its equivalent. Pub/sub protocols can support this functionality. FIGS. 13 and 14 show examples for Jabber's Pub/Sub protocol and XMPP-IM presence protocol, respectively. In these protocols, a subscribe command may be new or may be received when a subscription already exists, but resets the preferences.

In the third embodiment, the pace setting preference is returned in a Notify response. Not all protocols support notify responses, so this embodiment may not be appropriate for all protocols. FIGS. 11 and 12 show examples for SIMPLE and RVP Pub/Sub protocol, respectively. Both are HTTP based, which requires a response to every HTTP command.

A method and system for presenting published information in a browser been disclosed. The present invention has been described in accordance with the embodiments shown, and one of ordinary skill in the art will readily recognize that there could be variations to the embodiments, and any variations would be within the spirit and scope of the present invention. For example, the viewer may be required to be authenticated for obtaining presence information (e.g., by entering a username and password). Accordingly, many modifications may be made by one of ordinary skill in the art without departing from the spirit and scope of the appended claims.

What is claimed is:

1. A method for presenting published information in a browser, comprising:
    providing a user control via a browser that allows for controlling a pacing of presentation of published information in the browser, the user control comprising at least one of:
        a first control for allowing a delaying of the presentation of the published information;
        a second control for allowing a presentation of a next instance of published information;
        a third control for allowing a specifying of a minimum time interval between presentation of successive instances of published information;
        and a fourth control for allowing a specifying of a number of instances of published information that are presented in a batch, each of the first control, the second control, the third control, and the fourth control being at least one of a browser widget and a control included in a received resource from a remote provider;
    receiving a pace setting from the user control;
    associating the pace setting with a subscription; and
    queuing published information corresponding to the subscription for presentation in the browser based on the pace setting.

2. The method of claim 1 wherein the first control for allowing the delaying of the presentation of published information comprises a combination hold/go control.

3. The method of claim 1 wherein the second control for allowing the presentation of the next instance of published information comprises an acknowledgement control.

4. The method of claim 1 wherein the third control for allowing the specifying of a minimum time interval comprises at least one of a fast control and a slow control.

5. The method of claim 1 further including allowing for configuring pace setting preferences such that when multiple browser windows are opened on a client device, the pace setting is associated with one or more of the opened browsers windows based on the pace setting preferences.

6. The method of claim 1 further including allowing for configuring pace setting preferences, wherein the pace setting is associated with a region of the browser providing the presentation of published information based on the pace setting preferences.

7. The method of claim 6, wherein the browser includes a plurality of browser tabs for presenting information and the region associated with the pace setting includes one or more of the browser tabs.

8. The method of claim 1 wherein providing the user control via the browser comprises displaying the user control in a user interface portion of the browser.

9. The method of claim 8 wherein queuing published information for presentation in the browser further comprises queuing the published information on a client device on which the browser is executing.

10. The method of claim 9 wherein queuing published information for presentation in the browser further comprises maintaining a queue of the instances of published information for the subscription, and presenting the instances of published information from the queue in an order that the instances are received.

11. The method of claim 10 further including maintaining a plurality of queues corresponding to respective subscriptions that contain published information corresponding to the respective subscriptions.

12. The method of claim 1 wherein providing the user control via the browser further comprises displaying the user control in a user interface portion of browser content provided by a subscription service and displayed in the browser.

13. The method of claim 12 wherein receiving the pace setting from the user control further comprises receiving by the subscription service the pace setting from the browser via at least one of a publish command, a subscribe command, and a notify response.

14. The method of claim 12 wherein queuing published information for presentation in the browser further comprises queuing the published information by the subscription service that sends the published information.

15. A computer-readable medium containing program instructions for presenting published information in a browser, the program instructions for:
    providing a user control via a browser that allows for controlling a pacing of presentation of published information in the browser, the user control comprising at least one of:
        a first control for allowing a delaying of the presentation of the published information;
        a second control for allowing a presentation of a next instance of published information; a third control for allowing a specifying of a minimum time interval between presentation of successive instances of published information;

and a fourth control for allowing a specifying of a number of instances of published information that are presented in a batch, each of the first control, the second control, the third control, and the fourth control being at least one of a browser widget and a control included in a received resource from a remote provider;

receiving a pace setting from the user control; associating the pace setting with a subscription; and queuing published information corresponding to the subscription for presentation in the browser based on the pace setting.

16. The computer-readable medium of claim 15 wherein the first control for allowing the delaying of the presentation of published comprises a combination hold/go control.

17. The computer-readable medium of claim 15 wherein the second control for allowing the presentation of the next instance of published information comprises an acknowledgement control.

18. The computer-readable medium of claim 15 wherein the third control for allowing the specifying of a minimum time interval comprises at least one of a fast control and a slow control.

19. The computer-readable medium of claim 15 further including allowing for configuring pace setting preferences such that when multiple browser windows are opened on a client device, the pace setting is associated with one or more of the opened browsers windows based on the pace setting preferences.

20. The computer-readable medium of claim 15 further including allowing for configuring pace setting preferences, wherein the pace setting is associated with a region of the browser providing the presentation of published information based on the pace setting preferences.

21. The computer-readable medium of claim 20, wherein the browser includes a plurality of browser tabs for presenting information and the region associated with the pace setting includes one or more of the browser tabs.

22. The computer-readable medium of claim 15 wherein providing the user control via the browser comprises displaying the user control in a user interface portion of the browser.

23. The computer-readable medium of claim 22 wherein queuing the published information for presentation in the browser further comprises queuing published information on a client device on which the browser is executing.

24. The computer-readable medium of claim 23 wherein queuing the published information for presentation in the browser further comprises maintaining a queue of published information for the subscription, and presenting the published information from the queue in an order that the published information is received.

25. The computer-readable medium of claim 24 further including maintaining a plurality of published information queues corresponding to respective subscriptions that contain published information associated with the respective subscriptions.

26. The computer-readable medium of claim 15 wherein providing the user control via the browser further comprises displaying the user control in a user interface portion of browser content provided by a subscription service and displayed in the browser.

27. The computer-readable medium of claim 26 wherein receiving the pace setting from the user control further comprises receiving by the subscription service the pace setting from the browser via at least one of a publish command, a subscribe command, and a notify response.

28. The computer-readable medium of claim 26 wherein queuing published information for presentation in the browser further comprises queuing the published information by the subscription service that sends the published information.

29. A subscription web browser, comprising:

a user interface component configured to display a user control that allows for controlling a pacing of presentation of published information and to receiving a pace setting from the user control, the user interface component presented in at least one of a web page and a resource received from a remote content provider, the user control comprising at least one of:

a first control for allowing a delaying of the presentation of the published information;

a second control for allowing a presentation of a next instance of published information;

a third control for allowing a specifying of a minimum time interval between presentation of successive instances of published information;

and a fourth control for allowing a specifying of a number of instances of published information that are presented in a batch, each of the first control, the second control, the third control, and the fourth control being at least one of a browser widget and a control included in a received resource from a remote provider;

a subscription component coupled to the user interface component for associating the pace setting with a subscription; and a queue for queuing published information corresponding to the subscription for presentation in the subscription web browser based on the pace setting.

30. A method for allowing a user to control the pace at which published information is presented in a browser with a user control, the method comprising:

receiving a pacing setting via a browser; associating the pacing setting with a current subscription;

receiving published information associated with the current subscription;

and delaying the presentation of the published information based on the pacing setting, wherein the user control comprises at least one of:

a first control for allowing a delaying of the presentation of the published information;

a second control for allowing a presentation of a next instance of published information;

a third control for allowing a specifying of a minimum time interval between presentation of successive instances of published information;

and a fourth control for allowing a specifying of a number of instances of published information that are presented in a batch, each of the first control, the second control, the third control, and the fourth control being at least one of a browser widget and a control included in a received resource from a remote provider.

31. A system for controlling a rate of presentation of published information, comprising:

a subscription service for allowing senders of information to publish information and for sending notifications regarding the information to subscribers;

and a browser executing in a client device, the browser adapted to communicate with the subscription service via a publication/subscription (pub/sub) protocol, the browser including:

a user interface component configured to display a user control that allows for controlling a pacing of presentation of published information and to receive a pace setting from the user control, the user control comprising at least one of:
- a first control for allowing a delaying of the presentation of the published information;
- a second control for allowing a presentation of a next instance of published information;
- a third control for allowing a specifying of a minimum time interval between presentation of successive instances of published information;
- and a fourth control for allowing a specifying of a number of instances of published information that are presented in a batch, each of the first control, the second control, the third control, and the fourth control being at least one of a browser widget and a control included in a received resource from a remote provider;

a subscription component coupled to the user interface component for associating the pace setting with a subscription; and a queue for queuing published information associated with the notifications corresponding to the subscription for presentation in the browser based on the pace setting.

* * * * *